United States Patent
Yamagiwa et al.

(10) Patent No.: US 8,185,582 B2
(45) Date of Patent: May 22, 2012

(54) STORAGE SYSTEM, MANAGEMENT SERVER, SYSTEM RECONFIGURATION SUPPORT METHOD FOR A STORAGE SYSTEM, AND SYSTEM RECONFIGURATION SUPPORT METHOD FOR A MANAGEMENT SERVER

(75) Inventors: Hiromichi Yamagiwa, Yokohama (JP); Manabu Obana, Kawasaki (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/017,379

(22) Filed: Jan. 31, 2011

(65) Prior Publication Data
US 2011/0125938 A1 May 26, 2011

Related U.S. Application Data

(63) Continuation of application No. 12/010,052, filed on Jan. 18, 2008, now abandoned.

(30) Foreign Application Priority Data

Apr. 18, 2007 (JP) ................. 2007-109636

(51) Int. Cl.
*G06F 15/173* (2006.01)
(52) U.S. Cl. .............. 709/203; 709/220; 709/228
(58) Field of Classification Search ............ 709/203, 709/220, 228; 703/22
See application file for complete search history.

(56) References Cited

U.S. PATENT DOCUMENTS

| | | | |
|---|---|---|---|
| 5,897,661 A | 4/1999 | Baranovsky et al. | |
| 6,263,445 B1 | 7/2001 | Blumenau | |
| 6,449,652 B1 | 9/2002 | Blumenau et al. | |
| 7,023,979 B1 | 4/2006 | Wu et al. | |
| 7,194,538 B1 | 3/2007 | Rabe et al. | |
| 7,324,693 B2 * | 1/2008 | Chen | 382/199 |
| 7,328,260 B1 | 2/2008 | Muthiyan et al. | |
| 8,046,535 B2 * | 10/2011 | Shibayama et al. | 711/114 |
| 2005/0154576 A1 * | 7/2005 | Tarui et al. | 703/22 |
| 2008/0010580 A1 * | 1/2008 | Anderson et al. | 714/763 |
| 2008/0027769 A1 | 1/2008 | Eder | |
| 2008/0086295 A1 | 4/2008 | Okada et al. | |

FOREIGN PATENT DOCUMENTS

JP 2002-183416 A 6/2002

* cited by examiner

*Primary Examiner* — Khanh Dinh
(74) *Attorney, Agent, or Firm* — Hitachi America, Ltd.

(57) ABSTRACT

In order to provide support for a system to operate in a manner appropriate for system requests desired by a user, a management server acquires functions corresponding to system requests acquired using a user interface using a second table for storing a correspondence relationship of functions provided by one or more managed storage devices and system requests occurring at the storage system, simulates whether or not implementation of the system requests is possible from the acquired functions and functions corresponding to the system requests occurring at the current storage system acquired using a third table for storing information for functions provided by the one or more storage devices, and notifies the one or more storage devices of instructions to set functions corresponding to the system requests to valid based on the simulation results of this simulation.

12 Claims, 18 Drawing Sheets

FIG.2

| FUNCTION | SYSTEM REQUESTS | | |
|---|---|---|---|
| | "IT IS WISHED TO TRANSFER ENCRYPTED DATA" | "IT IS WISHED TO ENCRYPT DATA ON THE DISC" | "IT IS WISHED TO WRITE-PROTECT THE DISC" |
| STORED DATA ENCRYPTION | NO | YES | NO |
| TRANSFERRED DATA ENCRYPTION | YES | NO | NO |
| ... | ... | ... | ... |
| LUN SECURITY | YES | YES | YES |
| DISC WRITE-INHIBIT | NO | NO | YES |
| ... | ... | ... | ... |

FIG.3

| STORAGE PROGRAM | FUNCTION | DEVICE TYPE |
|---|---|---|
| Program1 | TRANSFER ENCRYPTED DATA | StorageType1 |
| Program2 | LUN SECURITY | StorageType1 |
| Program3 | STORE ENCRYPTED DATA | StorageType2 |

| DEVICE TYPE | PRODUCT NUMBER | VOLUME | STORED DATA ENCRYPTION | TRANSFERRED DATA ENCRYPTION | LUN SECURITY | DATE RETENTION UTILITY (WRITE PROTECT) |
|---|---|---|---|---|---|---|
| Storage Type1 | 001 | A:01 | YES | YES | YES | OPTIONAL |
| | | A:02 | YES | YES | YES | OPTIONAL |
| | | A:03 | YES | YES | YES | OPTIONAL |
| | | ... | ... | ... | ... | ... |
| Storage Type2 | 002 | 01 | YES | OPTIONAL | NO | NO |
| | | 02 | YES | OPTIONAL | NO | NO |
| | | ... | ... | ... | ... | ... |

| DEVICE TYPE | PRODUCT NUMBER | VOLUME | STORED DATA ENCRYPTION | TRANSFERRED DATA ENCRYPTION | LUN SECURITY | DATE RETENTION UTILITY (WRITE PROTECT) |
|---|---|---|---|---|---|---|
| Storage Type1 | 001 | A:01 | YES | NO | YES | NO |
| | | A:02 | YES | NO | YES | NO |
| | | A:03 | YES | NO | YES | NO |
| | | ... | ... | ... | ... | ... |
| Storage Type2 | 002 | 01 | NO | NO | NO | NO |
| | | 02 | NO | NO | NO | NO |
| | | ... | ... | ... | ... | ... |

| COPY PAIR | P-VOL | | S-VOL | | CONNECTED HOST | USED APPLICATIONS |
|---|---|---|---|---|---|---|
| | PRODUCT NUMBER | VOLUME | PRODUCT NUMBER | VOLUME | | |
| PAIR001 | 001 | A:01 | 002 | 01 | HOST_1 | APPLICATION 1 |
| PAIR002 | 001 | A:02 | 002 | 02 | HOST_2 | APPLICATION 1 |
| PAIR003 | 001 | A:03 | 002 | 03 | HOST_3 | APPLICATION 2 |
| ... | ... | ... | ... | ... | ... | ... |

| FUNCTION NAME | UTILIZATION POSSIBLE/ NOT POSSIBLE | SETTING NECESSARY/ UNNECESSARY | TARGET DEVICE | PROGRAM |
|---|---|---|---|---|
| STORED DATA ENCRYPTION | NO | NO | - | - |
| TRANSFERRED DATA ENCRYPTION | YES | YES | 001 | - |
| DATA RETENTION UTILITY (WRITE PROTECT) | OPTIONAL | NO ... | 002 | Program1 |
| ... | ... | | ... | ... |

| FUNCTION | I/O STOP REQUEST | NECESSARY CONDITIONS AT THE TIME OF FUNCTION SETTING COLUMN |
|---|---|---|
| ENCRYPTED DATA TRANSFER | YES | — |
| STORE ENCRYPTED DATA | YES | USING EXISTING DATA ENCRYPTION |
| DISC WRITE-INHIBIT | NO | — |
| ... | ... | ... |

| FUNCTION | PROGRAM | SETTING |
|---|---|---|
| TRANSFER ENCRYPTED DATA | Program1 | ON |
| LUN SECURITY | - | ON |
| STORE ENCRYPTED DATA | Program3 | OFF |

3221  3222  3223

STORAGE SYSTEM, MANAGEMENT SERVER, SYSTEM RECONFIGURATION SUPPORT METHOD FOR A STORAGE SYSTEM, AND SYSTEM RECONFIGURATION SUPPORT METHOD FOR A MANAGEMENT SERVER

CROSS-REFERENCES TO RELATED APPLICATIONS

This application is a continuation of U.S. patent application Ser. No. 12/010,052, filed Jan. 18, 2008, which is relates to and claims priority from Japanese Patent Application No. 2007-109636, filed on Apr. 18, 2007, the entire disclosure of which is incorporated herein by reference.

BACKGROUND

1. Field of the Invention

The present invention relates to a storage system, management server, system reconfiguration support method for a storage system, and system reconfiguration support method for a management server, and is particularly suited to, for example, application in reconfiguration support of system requests for configuring security functions of a storage system.

2. Description of Related Art

In recent years, security threats to SAN (Storage Area Network) environments have become problematic. With regards to such problems, it is therefore necessary for an administrator of the storage system to implement operations to satisfy the various requests by combining security functions supplied by each device such as a host connected to the SAN and storage devices etc.

Further, technology configured so as to carry out a highly precise performance evaluation at the time of estimating system configuration and propose a configuration satisfying performance requirements and price requirements in a short time is well-known as a system proposing method (for example, refer to patent document 1).

[Patent Document 1] Japanese Patent Laid-open Publication No. 2002-183416.

However, at the storage system, it is difficult for users managing the storage system to construct an appropriate system configuration. The cause of this may be considered to be the following. First, the user has to select the appropriate functions from the complex functions possessed by each device such as host and storage devices etc. However, the functions of each device tend to be diverse. Next, in a SAN environment, operation is carried out by a plurality of devices in combination, such as between hosts and storage devices, or between storage devices and storage devices, etc. Necessary functions therefore differ depending on the combined configurations. Finally, there are also cases where a system configuration may not be a configuration capable of using functions appropriate for the system requests demanded by the user. Further, the user may not comprehend the validity of functions more appropriate for the system requests requested by the user than the functions currently being used by the storage system, and there are therefore cases where the programs at each device are not the newest versions. These causes meant that constructing a system configuration demanded by the user is difficult.

In order to take the aforementioned points into consideration, the present invention sets out to provide a storage system, management server, system reconfiguration support method for a storage system, and system reconfiguration support method for a management server capable of supporting a system operation appropriate for the system requests desired by the user.

SUMMARY

The present invention is storage system having one or more storage devices and a management server managing the one or more storage devices, the one or more storage devices comprising a first table for storing supplied functions and setting conditions for the functions, and the management server comprising a second table for storing a correspondence relationship between functions supplied by the one or more storage devices and system requests for the storage system, a third table for storing information for functions supplied by the one or more storage devices, a user interface for receiving input of predetermined system requirements, an acquiring section for acquiring functions corresponding to system requirements received by the user interface using the second table, a simulation section for simulating whether or not it is possible to implement the system requests from functions acquired by the acquiring section and functions corresponding to the system requests of the current storage system acquired using the third table, and a notifying section for notifying the one or more storage devices of instructions to set functions occurring at the first table corresponding to the system requests to valid based on simulation results at the simulation section.

Namely, the one or more storage devices with a first table for storing supplied functions and setting conditions for the functions and a management server of a storage system including a management server for managing the one or more storage devices are capable of supporting system reconfiguration of the storage system by acquiring functions corresponding to system requests received by the user interface using a second table for storing a correspondence relationship between functions supplied by the one or more storage devices and system requests for the storage system. It is then simulated as to whether or not implementation of the system requests is possible from the acquired functions and functions corresponding to the system requests occurring at the current storage system acquired using a third table for storing information for functions provided by the one or more storage devices. The one or more storage apparatus are then notified of instructions setting functions of the first table corresponding to the system requests to valid based on the results of the simulation.

Further, the present invention is also a management server for managing one or more storage devices having a first table for storing supplied functions and setting conditions for the functions, comprising a second table for storing a correspondence relationship between functions supplied by the one or more storage devices and system requests for the storage system, a third table for storing information for functions supplied by the one or more storage devices, a user interface for receiving input of predetermined system requests, an acquiring section for acquiring functions corresponding to system requests received by the user interface using the second table, a simulation section for simulating whether or not it is possible to implement the system requests from functions acquired by the acquiring section and functions corresponding to the system requests of the current storage system acquired using the third table, and a notifying section for notifying the one or more storage devices of instructions to set functions occurring at the first table corresponding to the system requests to valid based on simulation results at the simulation section.

Namely, a management server for managing one or more storage devices with a first table for storing supplied functions and setting conditions for the functions is capable of supporting system reconfiguration of the storage system by acquiring functions corresponding to system requests received by the user interface using a second table for storing a correspondence relationship between functions supplied by the one or more storage devices and system requests for the storage system. It is then simulated as to whether or not implementation of the system requests is possible from the acquired functions and functions corresponding to the system requests occurring at the current storage system acquired using a third table for storing information for functions provided by the one or more storage devices. The one or more storage apparatus are then notified of instructions setting functions of the first table corresponding to the system requests to valid based on the results of the simulation.

According to the present invention, it is possible to provide a storage system, management server, system reconfiguration support method for a storage system, and system reconfiguration support method for a management server capable of supporting a system operation appropriate for the system requests desired by the user.

Other aspects and advantages of the invention will be apparent from the following description and the appended claims.

BRIEF DESCRIPTION OF THE DRAWINGS

FIG. 2 is a view showing a system request mapping table of the present invention;

FIG. 3 is a view showing a configuration management table of the present invention;

FIG. 4 is a view showing a system configuration information table of the present invention;

FIG. 5 is a view showing a system utilization condition management table of the present invention;

FIG. 6 is a view showing a configuration definition management table of the present invention;

FIG. 7 is a view showing the simulation results table of the present invention;

FIG. 8 is a view showing a function setting changing management table of the present invention;

FIG. 9 is a view showing a configuration definition table of the present invention;

DETAILED DESCRIPTION OF PREFERRED EMBODIMENTS

The following is a detailed description with reference to the drawings of embodiments of the present invention. The present invention is by no means limited to the embodiments described in the following.

Figure 1:
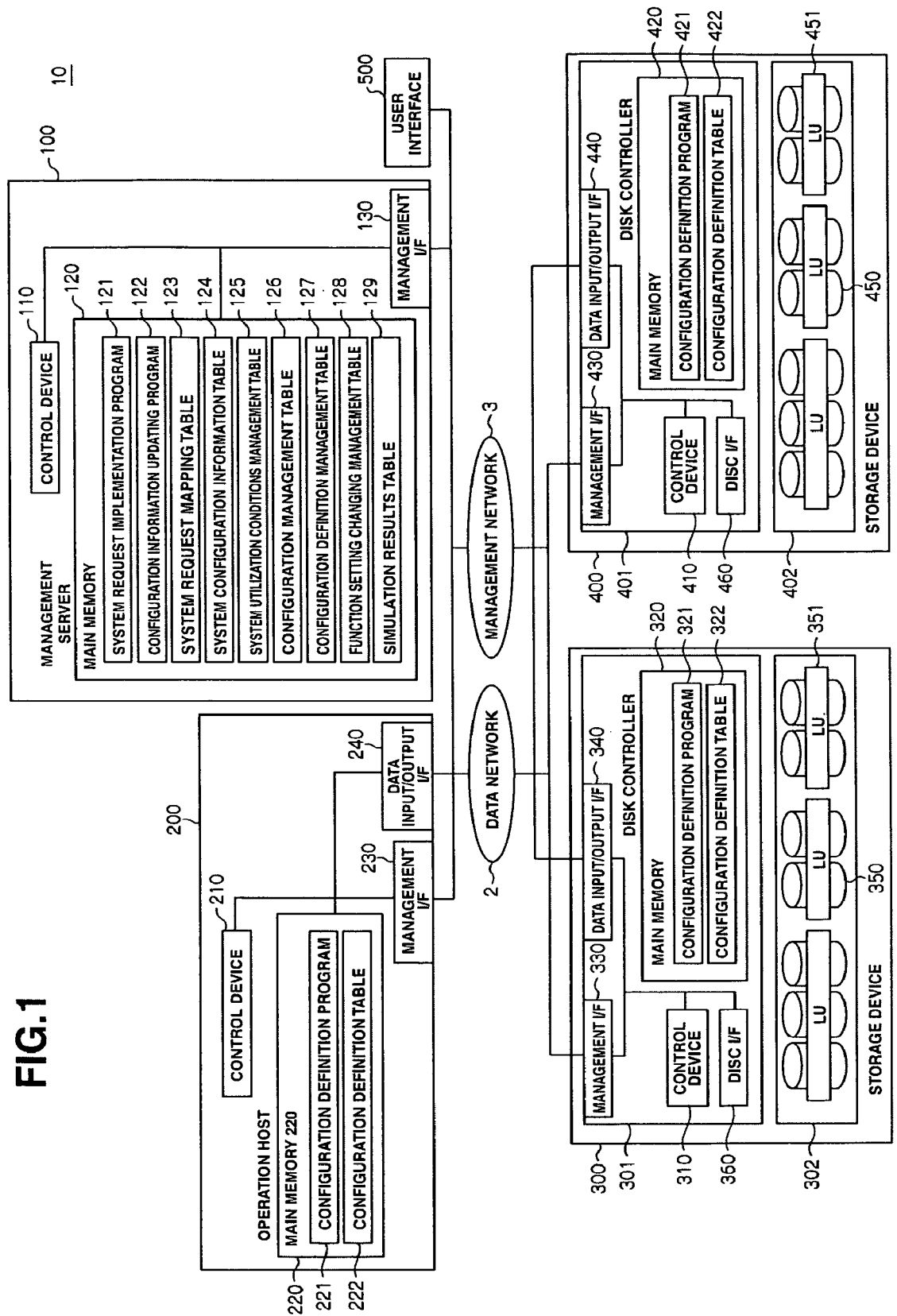
FIG. 1 is a view showing a configuration of a storage system of the present invention.

FIG. 1 is a view showing a configuration for a storage system 10 to which the present invention is applied. As shown in FIG. 1, storage system 10 comprises a management server 100, operation host 200, storage device 300, storage device 400, and user interface 500 connected as a Storage Area Network (SAN). This SAN-connected network includes a data network 2 and a management network. The data network 2 is a network used for transmitting and receiving data between the operation host 200, storage device 300 and storage device 400. The management network 3 is a network used for the management server 100 to send commands for managing the operation host 200, storage device 300 and storage device 400 and receive the results of responses to the commands etc. At the storage system 10 shown in FIG. 1, a description is given of the case where two storage devices such as storage device 300 and storage device 400 are present but the present invention is by no means limited to the case where there are two storage devices.

The management server 100 is comprised of a control device 110, main memory 120 and management interface (I/F) 130. The control device 110 is a microcomputer with a CPU and memory etc. built-in and controls processing executed by management server 100. The main memory 120 stores various programs and various tables. System request implementation program 121 and configuration information updating program 122 are stored as the various programs. System request mapping table 123, system configuration information table 124, system utilization conditions management table 125, configuration management table 126, configuration definition management table 127, function setting changing management table 128, and simulation results table 129 are stored as the various tables. A management interface 130 controls data communication via the management network 3.

System requests are requests it is wished to satisfy while a user is utilizing a device connected to the SAN. For example, "it is wished to transfer encrypted data between copy pairs", or "it is wished to permit accesses only from specific hosts", etc.

The operation host 200 has a control device 210, main memory 220, management interface (I/F) 230, and data input/output interface (I/F) 240. The control device 210 is a microcomputer with a CPU and memory etc. built-in, and controls processing executed by the operation host 200. The main memory 220 stores various programs such as typical operation programs for the operation host 200 to execute operations and the configuration definition program 221 etc. and various tables. For example, a configuration definition table 222 is stored as one of the various tables. A management interface 230 controls data communication via the management network 3. The data input/output interface 240 controls data communication via the data network.

The storage device 300 is comprised of a disc controller section 301 and a disc section 302. The disc controller section 301 comprises a control device 310, main memory 320, management interface (I/F) 330, data input/output interface (I/O) 340 and disc interface (I/F) 360. The disc section 302 has a plurality of logical units (LU's) 351, and stores various data using the logical units 351. The logical units 351 contain a plurality of volumes.

The control device 310 is a microcomputer with a CPU and memory etc. built-in, and controls processing executed by the storage device 300. The main memory 320 stores typical programs for making the storage device 300 function as a storage device, and stores various programs and tables such as configuration definition program 321, etc. A configuration definition table 322 is stored as one of the various tables.

The storage device 400 is comprised of a disc controller section 401 and a disc section 402. The disc controller section 401 comprises control device 410, main memory 420, management interface (I/F) 430, data input/output interface (I/O) 440 and disc interface (I/F) 460. Disc section 302 has a plurality of logical units (LU's) 451, and stores various data using the logical units 451. The logical units 451 contain a plurality of volumes 350.

The control device 410 is a microcomputer with a CPU and memory etc. built-in, and controls processing executed by the storage device 400. The main memory 420 stores typical programs for making the storage device 400 function as a storage device, and stores various programs and tables such as configuration definition program 421, etc. A configuration definition table 422 is stored as one of the various tables.

A user interface 500 is provided with a display section such as a display etc. and an operating section such as a keyboard and mouse, etc. A user uses an operating section of the user interface 500 in order to carry out various instructions at the management server 100. Further, the user acquires the necessary information for the operations from the display section of the user interface 500.

FIG. 2 is a view showing system request mapping table 123. The system request mapping table 123 is a table for storing system requests and a correspondence relationship for functions each SAN-connected device is provided with. In the following description, content disclosed in each table for operation host 200 is omitted for simplification of the description. System request mapping table 123 is provided with a function column 1231 and system request column 1232.

Function column 1231 stores, for example, security function names. The system request column 1232 is provided with storage columns 1233, 1234, and 1235 for storing system requests. "encryption of storage data", "encryption of transferred data", . . . , "security of logical unit numbers (LUN)" and "disc write inhibit" etc. are stored as functions in function column 1231. Further, system request "it is wished to transfer encrypted data" is stored in storage column 1233. A system request "it is wished to encrypt data on the disc" is stored in storage column 1234. A system request "it is wished to write-protect the disc" is stored in storage column 1235. Further, each function stored in function column 1231 and a setting of "YES" or "NO" corresponding to system requests stored in storage column 1233 to 1235 within system request column 1232 are stored in system request mapping table 123. "YES" indicates that this function is necessary in order to implement system requests, and "NO" indicates that this function is not required to implement system requests.

As shown in FIG. 2, for example, with regards to the encryption function for stored data of function column 1231, "NO" is stored in system request "it is wished to transfer encrypted data", "YES" is stored in system request "it is wished to encrypt data on the disc", and "NO" is stored in system request "it is wished to write-protect the disc". The function name stored in function column 1231 and the system requests stored in system requests column 1232 are by no means limited to the function name stored in function column 1231 shown in system request mapping table 123 of FIG. 2 and the system requests stored in storage columns 1233 to 1235 of system request column 1232.

FIG. 3 is a view showing a configuration management table 126. Configuration management table 126 is a table managing information for functions supplied by each device. Configuration management table 126 is provided with storage program column 1261, function column 1262, and device type column 1263. Storage program column 1261 stores program names of programs executed by storage device 300 and 400. Function column 1262 stores function names of programs stored in storage program column 1261. Device type column 1263 stores the type (storage type) of storage device storing programs indicated by program names stored in storage program column 1261. For example, storage type 1 indicates storage device 300, and storage type 2 indicates storage device 400.

As shown in FIG. 3, for example, for storage program name "program 1" of storage program column 1261, "encrypted data transfer" is stored in function column 1262 and "storage type 1" is stored in device type column 1263. The program name stored in storage program column 1261, the function name stored in function column 1262, and the storage type stored in device type column 1263 are by no means limited to the program name of storage program column 1261, the function name of function column 1262, and the device type of device type column 1263 shown in configuration management table 126 of FIG. 3.

FIG. 4 is a view showing system configuration information table 124. The system configuration information table 124 is a table storing information as to whether or not it is possible to utilize each function at volumes (here, volumes corresponds to logical unit 351) within storage device 300 and 400. The system configuration information table 124 is provided with a device type column 1241, product number column 1242, volume column 1243, storage data encryption column 1244, transferred data encryption column 1245, LUN security column 1246, and data retention utility (write-protect) column 1247.

Device type column 1241 stores the type (storage type) of storage device. Product number column 1242 stores the product number of the storage device. Volume column 1243 stores the number of the volume constituting a target. Storage data encryption column 1244, transferred data encryption column 1245, LUN security column 1246, and data retention utility column 1247 store settings of "YES", "NO", or "OPTIONAL" in a manner corresponding to each volume stored in volume column 1243. "YES" indicates that function utilization is possible, "NO" indicates that function utilization is not possible, and "OPTIONAL" indicates that function utilization is possible if the system is changed but that function utilization is not possible with the current system configuration. Changing of the system may be the case where, for example, a user manually installs a new program, etc.

As shown in FIG. 4, for "storage type 1" of device type column 1241, "001" is stored in product number column 1242, "A:01" is stored in volume column 1243, "YES" is stored in storage data encryption column 1244, "YES" is stored in transferred data encryption column 1245, "YES" is stored in LUN security column 1246, and "OPTIONAL" is stored in data retention utility column 1247. A description is given of the case of providing storage data encryption column 1244, transferred data encryption column 1245, LUN security column 1246 and data retention utility column 1247 as items provided every volume stored in volume column 1243 but this is by no means limited to these items.

FIG. 5 is a view showing system utilization conditions management table 125. System utilization conditions management table 125 is a table storing information as to whether or not each function at volumes within storage device 300 and 400 is utilized. The system utilization conditions management table 125 is provided with a device type column 1251, product number column 1252, volume column 1253, storage data encryption column 1254, transferred data encryption column 1255, LUN security column 1256, and data retention utility (write-protect) column 1257.

Device type column 1251 stores the type (storage type) of the storage device. Product number column 1252 stores the product number of the storage device. Volume column 1253 stores the number of the volume constituting a target. Storage data encryption column 1254, transferred data encryption column 1255, LUN security column 1256, and data retention utility column 1257 are capable of storing settings of "YES" or "NO" in a manner corresponding to each volume stored in volume column 1253. "YES" indicates that setting of the function is valid, and "NO" indicates that setting of the function is invalid.

As shown in FIG. 5, for example, for "storage type 1" of device type column 1251, "001" is stored in product number column 1252, "A:01" is stored in volume column 1253, "YES" is stored in storage data encryption column 1254, "YES" is stored in transferred data encryption column 1255, "YES" is stored in LUN security column 1256, and "NO" is stored in data retention utility column 1257.

FIG. 6 is a view showing the configuration definition management table 127. The configuration definition management table 127 is a table for storing objects constituting candidates for the application of system requests. Copy pair column 1271, primary volume (P-VOL) column 1272, secondary volume (S-VOL) column 1273, connected host column 1274 and used application column 1275 are provided in the configuration definition management table 127. The copy pair column 1271 stores copy pair numbers. Primary volume column 1272 stores a product number and volume for the primary volume set as a copy pair. Secondary volume column 1273 stores a product number and volume for the secondary volume set as the copy pair. Connected host column 1274 stores the number of the connected hosts. Used application column 1275 stores the names of applications used by the copy pair.

As shown in FIG. 6, product number "001" and volume "A:01" are stored in primary volume column 1272, product number "002" and volume "01" are stored in secondary volume column 1273, "HOST_1" is stored in connected host column 1274, and "used application 1" is stored in used application column 1275 in a manner corresponding to "PAIR001" of copy pair column 1271. In FIG. 6, a description is given of the case of storing copy pairs using primary volume column 1272 and secondary volume column 1273 but a single volume, path between host-storage, or external storage connection etc. is also possible.

FIG. 7 is a view showing the simulation results table 129. The simulation results table 129 is a table for storing simulation results. This simulation results table 129 is made each system request for each system request application object at the time of simulation execution.

A function name column 1291, utilization possible/not possible column 1292, setting necessary/unnecessary column 1293, target device column 1294 and program column 1295 are provided at the simulation results table 129. The function name column 1291 stores function names. Utilization possible/not possible column 1292 stores a flag indicating whether or not a function is utilizable using the current configuration. This flag may be set to "YES", "NO", or "OPTIONAL". "YES" indicates that utilization is possible, "NO" indicates that utilization is not possible, and "OPTIONAL" indicates that utilization is possible if the configuration of the system is changed but that utilization is not possible with the current system configuration. Setting necessary/unnecessary column 1293 is a flag that indicates whether or not changes to settings are possible at the device when utilization of a function is possible. "YES" or "NO" is stored as this flag. "YES" indicates that it is possible to change settings at the device, and "NO" indicates that changes to settings is not possible at the device. Target device column 1294 stores the product number of the device carrying out changes to settings. Program column 1295 stores the names of programs for executing the functions.

As shown in FIG. 7, "OPTIONAL" is stored in utilization possible/not possible column 1292, "NO" is stored in setting necessary/unnecessary column 1293, "002" is stored in target device column 1294, and "program 1" is stored in program column 1295 in a manner corresponding to "data retention utility" of function name column 1291.

FIG. 8 is a view showing function setting changing management table 128. The function setting changing management table 128 is a table storing information as to whether or not it is necessary to stop I/O or whether operations accompanying function setting are necessary during setting of functions for each device.

A function name column 1281, I/O stop request column 1282 and necessary conditions at the time of function setting column 1283 are provided at the function setting changing management table 128. The function name column 1281 stores function names. The I/O stop request column 1282 stores a setting as to whether or not a request requesting stopping of I/O of a function corresponding to a function name stored in the function name column 1281 is possible. "YES" or "NO" is stored in the I/O stop request column 1282. "YES" indicates that an I/O stop request is necessary, and "NO" indicates that an I/O stop request is not necessary. Necessary conditions at the time of function setting column 1283 stores conditions necessary for setting functions stored in function name column 1281. When "-" is set in the necessary conditions at the time of function setting column 1283, this indicates that there are no necessary conditions at the time of function setting.

For example, as shown in FIG. 8, "YES" is stored in I/O stop request column 1282 corresponding to "storing of encrypted data" of function name column 1281, and "encryption of existing data" is stored in necessary conditions at the time of function setting column 1283.

FIG. 9 is a view showing a configuration definition table 322. The configuration definition table 322 is a table indicating installed programs, the functions provided and the setting conditions. A function column 3221, program column 3222 and setting column 3223 are provided at configuration definition table 322. The function column 3221 stores function names. The program column 3222 stores the names of programs for executing the functions stored in the function column 3221. The setting column 3223 stores whether or not a function stored in function column 3221 is set. "ON" or "OFF" is stored in setting column 3223. "ON" indicates that setting of the function is valid and "OFF" indicates that setting of the function is invalid.

For example, as shown in FIG. 9, "program 1" is stored in the program column 3222 and "ON" is stored in the setting column 3223 so as to correspond with the "encrypted data transfer" of function name column 3221.

The configuration definition table 222 is stored in the management server 100 and the configuration definition table 422 is stored in the storage device 400 but the configuration definition tables 322 and 422 have the same configuration as the configuration definition table 222 and are therefore not described.

Next, a description is given of each of the various setting screens displayed at the user interface 500 using FIG. 17 to FIG. 23. Each of the various setting screens are displayed at the user interface 500 when processing described in the following using FIG. 10 to FIG. 15 is executed.

Figure 17:
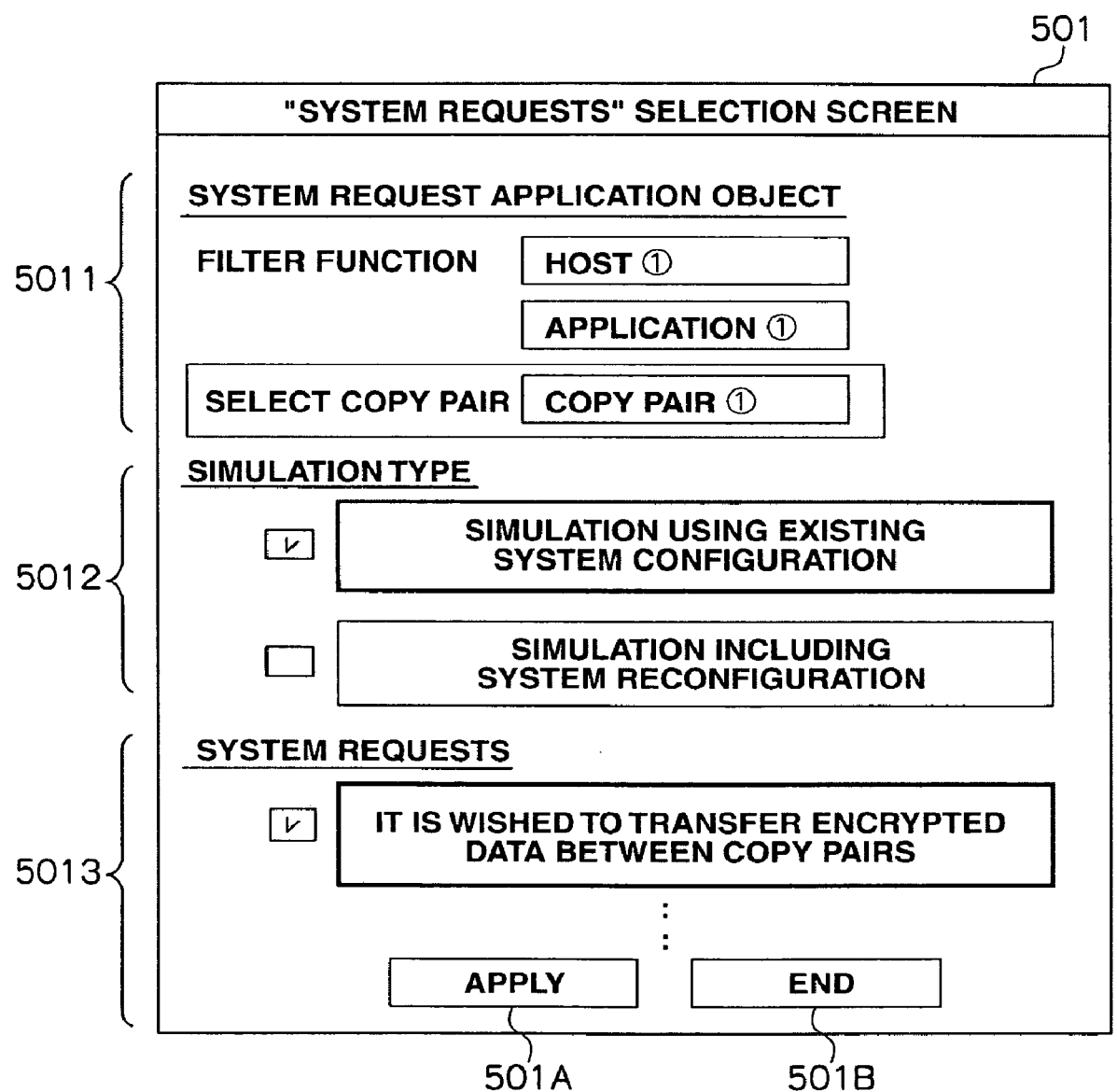
FIG. 17 is a view showing a system request selection screen of the present invention.

FIG. 17 is a view showing a system request selection screen 501 displayed at the user interface 500. The system request selection screen 501 is a screen displayed at the user interface 500 when processing of the system request implementation program 121 starts.

As shown in FIG. 17, setting columns 5011 to 5013, apply button 501A and end button 501B are provided at the system request selection screen 501. The setting column 5011 is capable of carrying out setting of system request application objects, the setting column 5012 is capable of setting the type of simulation, and the setting column 5013 is capable of carrying out setting of system requests. The apply button 501A is a button for deciding to apply content set at setting columns 5011 to 5013. The end button 501B is a button for designating the end of setting at the system request selection screen 501.

Setting column 5011 is capable of selecting a copy pair together with a host and application applying the filter function. The filter function is a function used to narrow in on a copy pair from the plurality of copy pairs. It is also possible for a user to select a copy pair using the user interface 500 without using the filter function. Setting column 5012 enables the simulation type to be set, with it being possible to select simulation for the existing system configuration or simulation that includes reconfiguration of the system. System requests can be set using setting column 5013.

In setting column 5011, host 1 and application 1 are selected as a filter function, and copy pair 1 is selected as a copy pair. Further, a simulation using the existing system configuration is selected as the simulation type at the setting column 5012. "It is wished to transfer encrypted data between copy pairs" is selected as a system request at setting column 5013. The selection of the settings from the setting columns 5011 to 5013 and the input of the apply button 501A and the end button 501B are carried out by the user using the user interface 500.

At the setting column 5011 of FIG. 17, a description is given of a configuration for selecting a file function or copy pair during selection of copy pairs but selection of the copy pairs is by no means limited in this respect. For example, it is also possible for a copy-source indication column for displaying a copy-source for a copy-pair and a copy-destination column for displaying a copy destination to be provided at setting column 5011, and for the user to input and set copy source and copy destination information to these columns.

Figure 18:
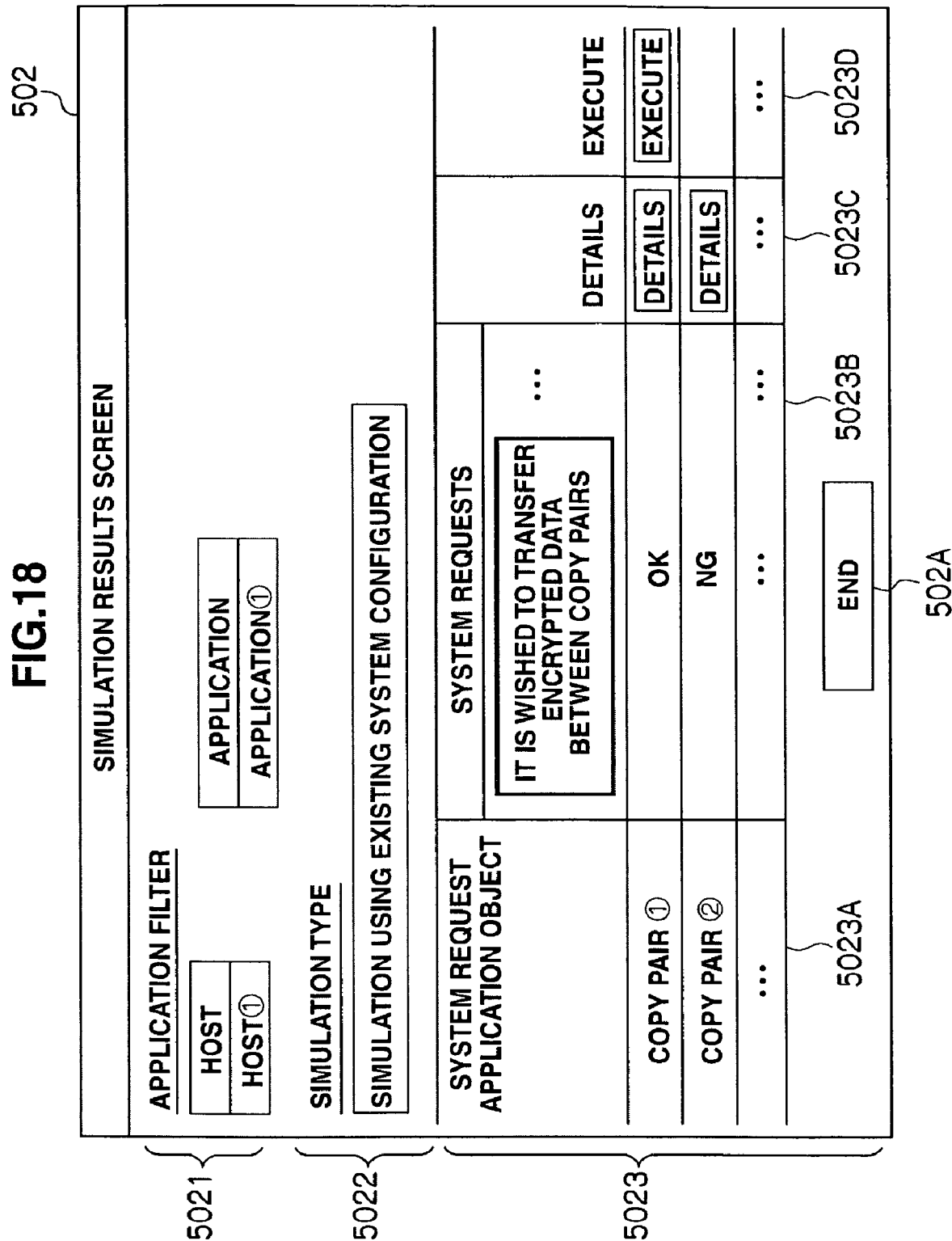
FIG. 18 is a view showing a simulation results screen of the present invention.

FIG. 18 is a view showing a simulation results screen 502 displayed at the user interface 500. The simulation results screen 502 is a screen displayed at the user interface 500 when a simulation is executed. The simulation results screen 502 is a screen for the case of carrying out a simulation using an existing system configuration as the simulation type.

As shown in FIG. 18, indication columns 5021 to 5023 and end button 502A are displayed at the simulation results screen 502. The indication column 5021 displays the content of the applied filters and specifically displays a host name and application name. Indication column 5022 displays the simulation type. Indication column 5023 displays the simulation results. The end button 502A is a button indicating the end of displaying of the simulation results screen 502.

The host 1 and application 1 are indicated at indication column 5021. Further, a simulation taking an existing system configuration as a simulation type is indicated at indication column 5022. System request application object column 5023A, system request column 5023B, detail column 5023C and execute column 5023D are provided at indication column 5023. The system request application object column 5023A displays objects for applying the system requests. The system request column 5023B displays settings every system request and object. The detail column 5023C displays a detail button. The execute column 5023D displays an execute button.

At system request application object column 5023A, copy pair 1 and copy pair 2 are displayed as system request application objects, and "it is wished to transfer encrypted data between copy pairs" is displayed as a system request. The system request for copy pair 1 is "OK" but the system request for copy pair 2 is "NG". Detail buttons are displayed in detail column 5023C in a manner corresponding to copy pair 1 and copy pair 2. When a detail button of detail column 5023C is pressed down, the details of the corresponding simulation results are displayed at simulation results details screen 503 described in the following. An execute button for executing application to the system based on the simulation results is displayed at execute column 5023D. The execute button displayed at execute column 5023D is only displayed for system request application objects for which application of system requests is possible.

For example, as shown in FIG. 18, copy pair 1 is displayed at system request application object column 5023A, and "OK" is displayed in system request column 5023B, a "detail button" is displayed at detail column 5023C, and an execute button is displayed at execute column 5023D in a manner corresponding to this copy pair 1. Further, copy pair 2 is displayed at system request application object column 5023A, and an "NG" is displayed in system request column 5023B and a "detail button" is displayed at detail column 5023C in a manner corresponding to this copy pair 2. An "execute button" is not displayed at execute column 5023D in the case of copy pair 2 because the system request is "NG".

Figure 19:
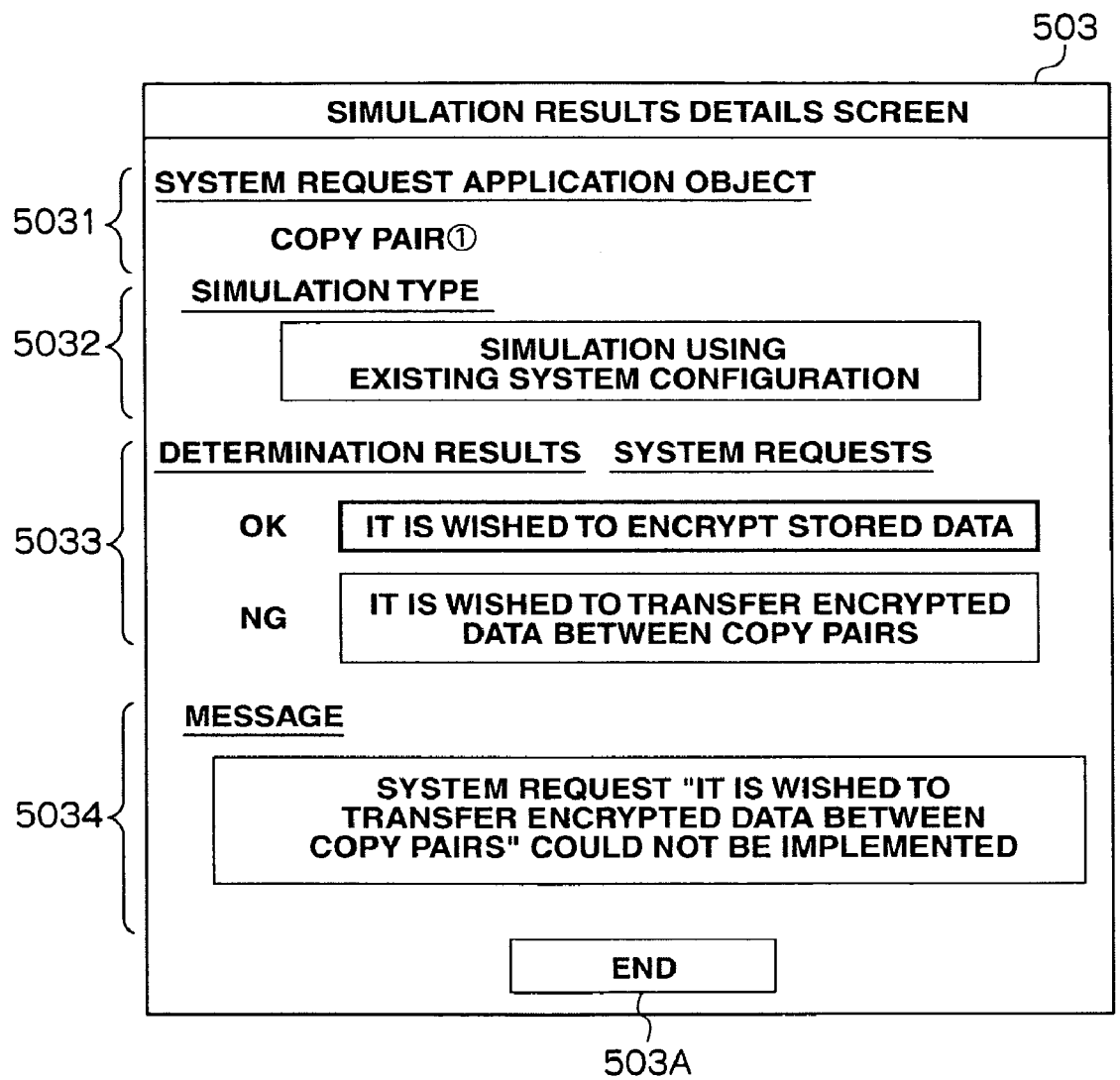
FIG. 19 is a view showing a simulation results details screen of the present invention.

FIG. 19 is a view showing the simulation results details screen 503. The simulation results details screen 503 is a screen displayed at the user interface 500 when the detail button of detail column 5023C is pressed down by the user using the user interface 500.

A system request application object column 5031, a simulation type column 5032, a determination results system requests column 5033, a message column 5034 and an end button 503A are displayed at simulation results details screen 503. The system request application object column 5031 display objects for applying the system requests. The simulation type column 5032 displays the simulation type. The determination results system request column 5033 displays whether determination results are "OK" or "NG", and displays system requests corresponding to the result of this determination. The message column 5034 displays a message to be conveyed to the user. The end button 503A is a button indicating the end of displaying of the simulation results details screen 503.

For example, as shown in FIG. 19, a copy pair 1 is displayed in system request application object column 5031. A simulation using an existing system configuration is indicated at simulation type column 5032. The system request "It is wished to encrypt stored data" is displayed corresponding to determination results of "OK" at determination results system request column 5033, and a system request "It is wished to transfer encrypted data between copy pairs" is displayed corresponding to determination results of "NG". A message "system request: it is not possible to implement the desire to transfer encrypted data between copy pairs" is displayed at message column 5034.

Figure 20:
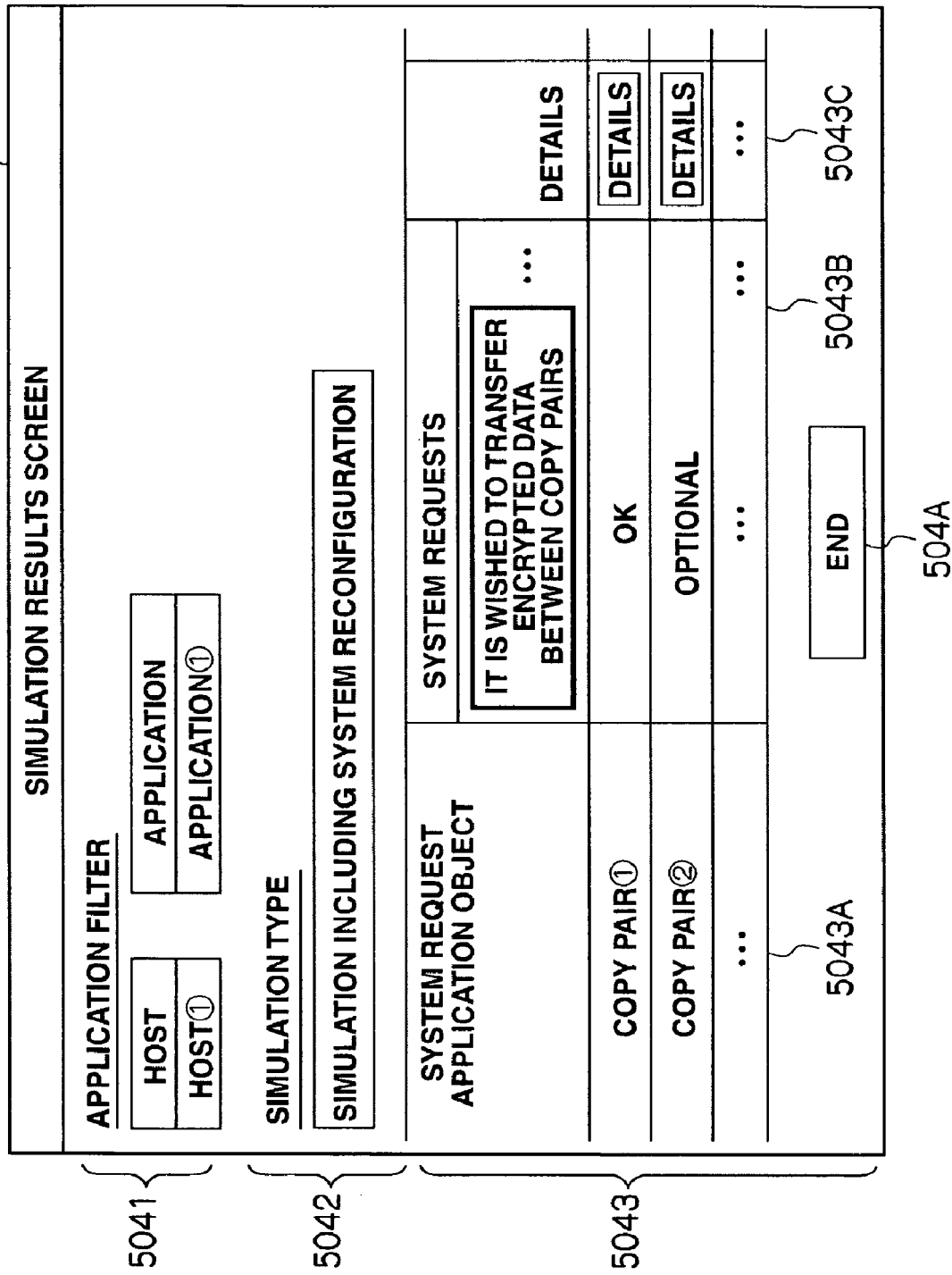
FIG. 20 is a view showing a simulation results screen of the present invention.

FIG. 20 is a view showing a simulation results screen 504 displayed at the user interface 500. The simulation results screen 504 is a screen displayed at the user interface 500 when a simulation is executed. The simulation results screen 504 is a screen for the case of carrying out a simulation including reconfiguration of the system as the simulation type.

As shown in FIG. 20, indication column 5041 to 5043 and end button 504A are displayed at the simulation results screen 504. The indication column 5041 displays the content of the applied filters and displays a host name and application name. Indication column 5042 displays the simulation type. Indication column 5043 displays the simulation results. The end button 504A is a button indicating the end of displaying of the simulation results screen 504.

Host 1 and application 1 are indicated at indication column 5041. The fact that a simulation including reconfiguration of the system is taken as a simulation type is indicated at indication column 5042. System request application object column 5043A, system request column 5043B and detail column 5043C are provided at indication column 5043. The system request application object column 5043A displays objects for applying the system requests. The system request column 5043B displays settings every system request and object. The setting of the system requests column 5043B displays "YES", "NO", or "OPTION". The detail column 5043C displays a detail button.

For example, copy pair 1 is displayed at system request application object column 5043A, and "OK" is displayed in system request column 5023B and a "detail button" is displayed at detail column 5023C in a manner corresponding to this copy pair 1. Further, copy pair 2 is displayed at system request application object column 5023A, and an "OPTIONAL" is displayed in system request column 5023B and a "detail button" is displayed at detail column 5023C corresponding to this copy pair 2.

Figure 21:
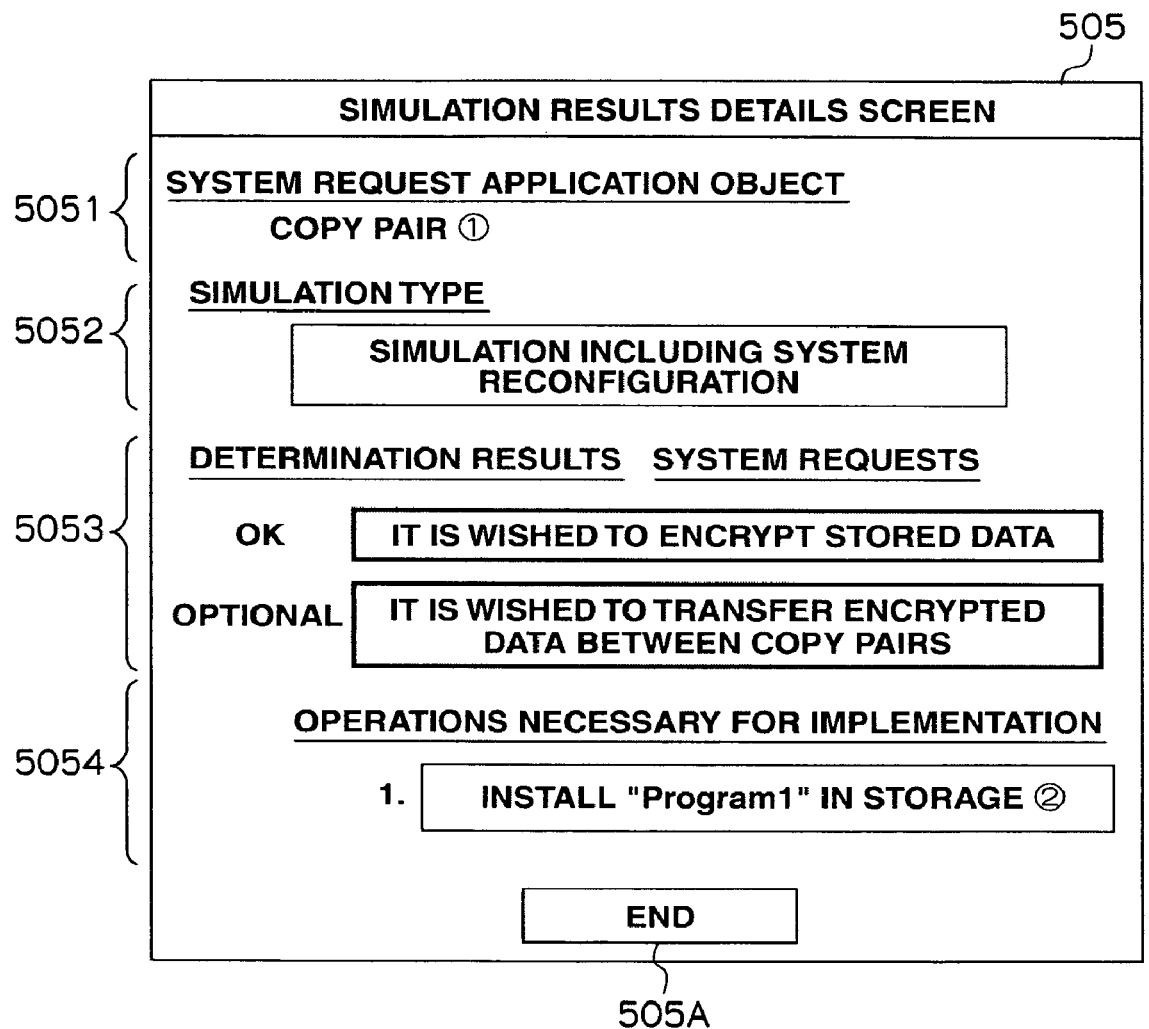
FIG. 21 is a view showing a simulation results details screen of the present invention.

FIG. 21 is a view showing an example of the simulation results detail screen 505. The simulation results detail screen 505 is a screen displayed at the user interface 500 when the detail button of the detail column 5023C described in FIG. 20 is pushed down by the user.

A system request application object column 5051, a simulation type column 5052, a determination results system requests column 5053, a necessary operations for implementation column 5054 and an end button 505A are provided at simulation results detail screen 505. The system request application object column 5051 display objects for applying the system requests. The simulation type column 5052 displays the simulation type. The determination results system request column 5053 displays whether determination results are "OK", "NG", or "OPTIONAL" and displays system requests corresponding to the result of this determination. The necessary operations for implementation column 5054 displays a message illustrating the operations necessary for implementation to the user. The end button 505A is a button indicating the end of displaying of the simulation results detail screen 505.

For example, as shown in FIG. 21, the copy pair 1 is displayed in system request application object column 5051. It is then displayed at simulation type column 5052 that there is a simulation including system reconfiguration. "It is wished to encrypt stored data" is displayed as a system request corresponding to determination results of "OK" at determination results system request column 5033, and "It is wished to transfer encrypted data between copy pairs" is displayed as a system request corresponding to determination results of "OPTIONAL". A message of "please install program 1 in storage 2" is displayed at necessary operations for implementation column 5054.

Figure 22:
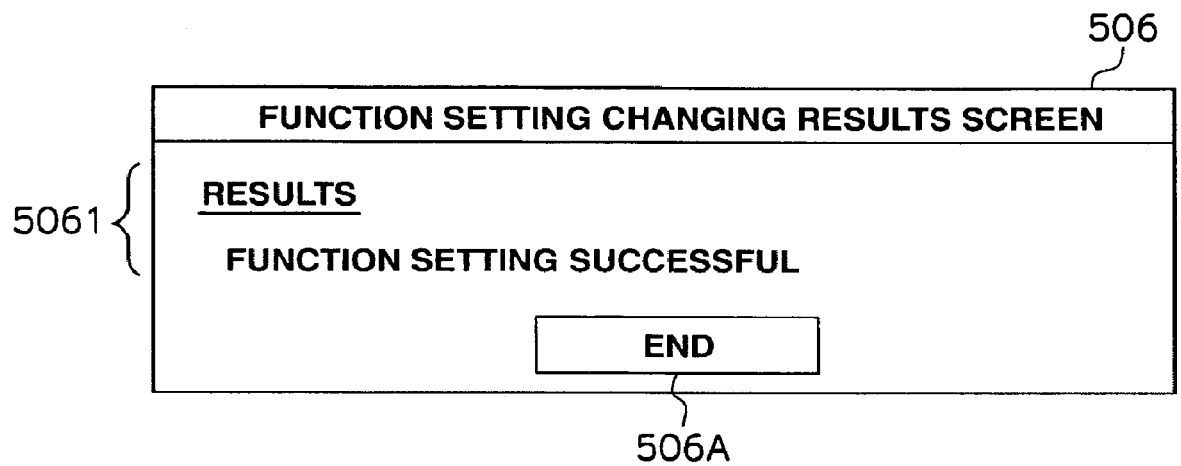
FIG. 22 is a view showing a function setting changing results screen of the present invention.

FIG. 22 is a view showing a function setting changing results screen 506. The function setting changing results screen 506 is a screen informing of the results of changing settings for functions of the storage device 300 and the storage device 400, and is displayed when changing of settings for functions are successful. A results column 5061 and an end button 506A are displayed at function setting changing results screen 506. The results column 5061 displays results of changing function settings. The end button 506A is a button indicating the end of displaying of the function setting changing results screen 506.

For example, as shown in FIG. 22, a message of "function setting successful" is displayed in results column 5061.

Figure 23:
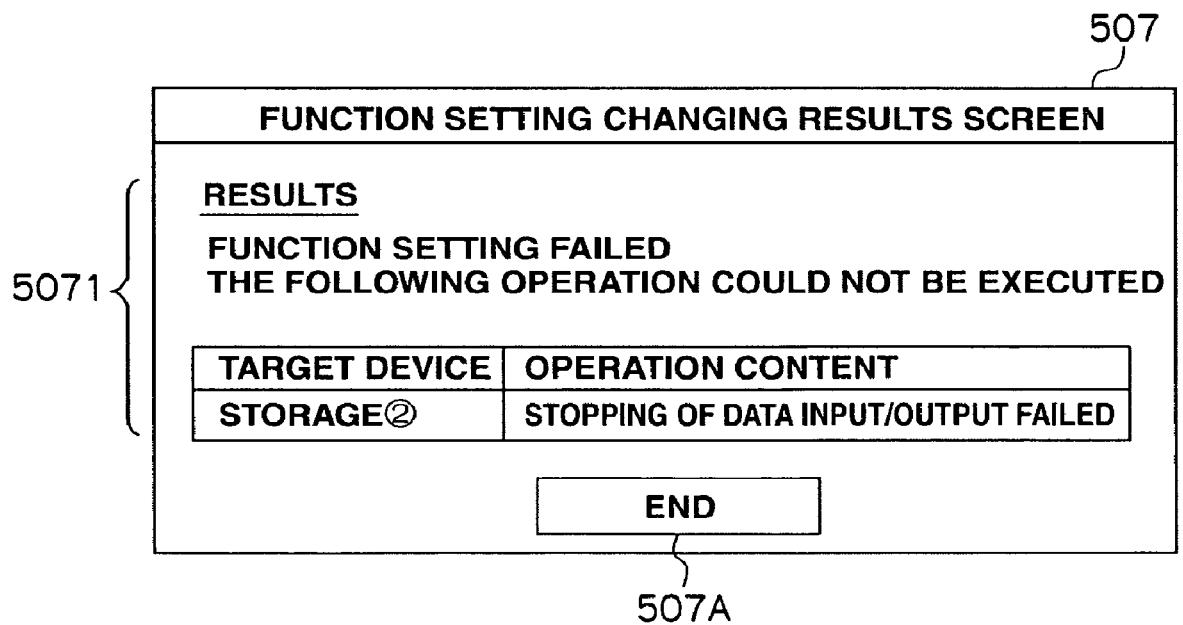
FIG. 23 is a further view showing a function setting changing results screen of the present invention.

FIG. 23 is a view showing a function setting changing results screen 507. The function setting changing results screen 507 is a screen informing of the results of changing settings for functions of the storage device 300 and the storage device 400, and is displayed when changing of settings for functions fails. A results column 5071 and an end button 507A are displayed at function setting changing results screen 507. The results column 5071 displays results of changing function settings. The end button 507A is a button indicating the end of displaying of the function setting changing results screen 507.

For example, as shown in FIG. 23, a message of "Function setting failed. The following operation could not be implemented.", the device subjected to function setting, and the operation content are displayed at results column 5071. "Storage 2" may be displayed as the target device and "stopping of data input/output failed" may be displayed as operation content, etc.

Figure 10:
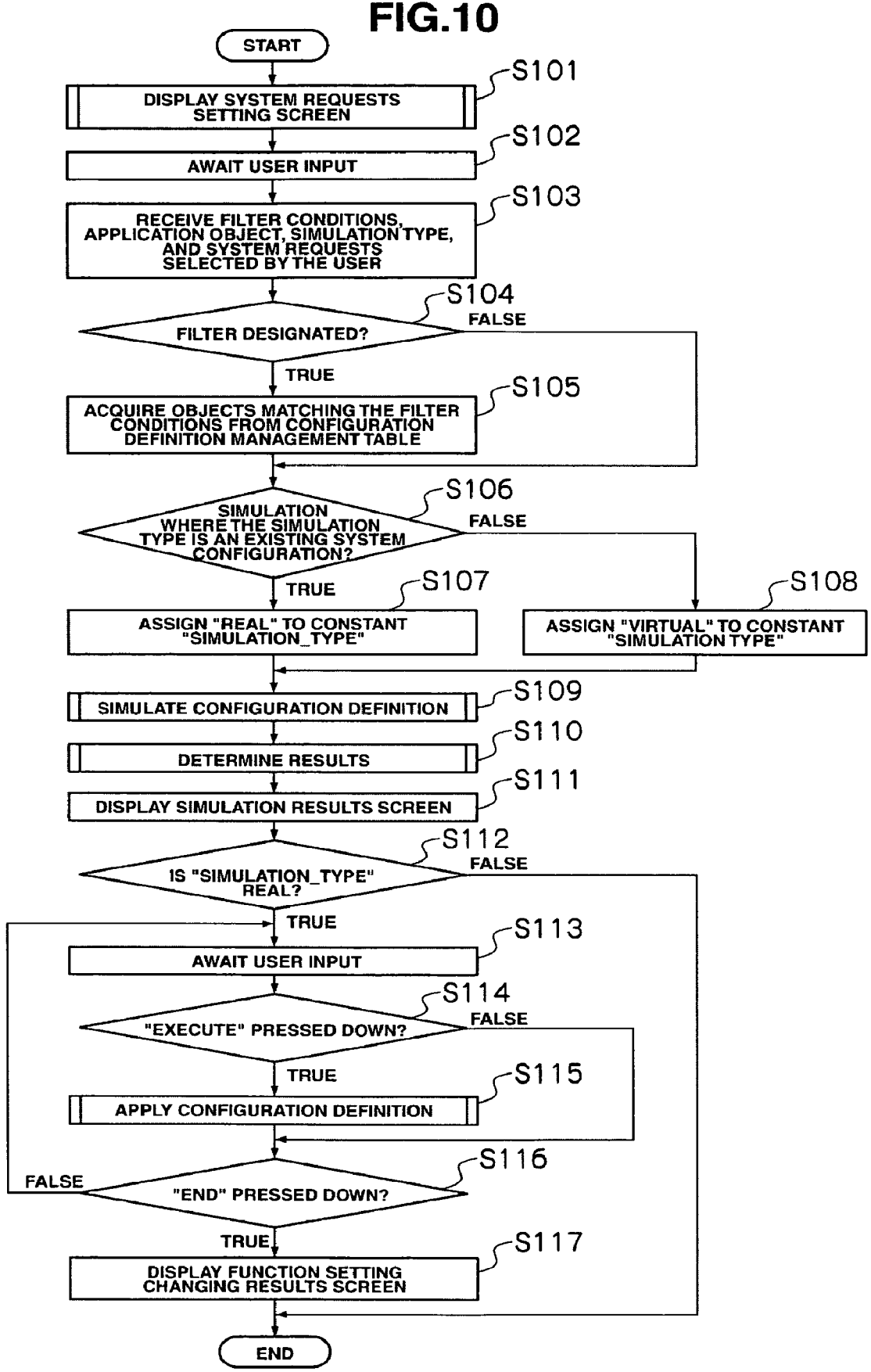
FIG. 10 is a flowchart showing processing when a system request implementation program is executed at a control device of a management server of the present invention.

Next, a description is given of system request implementation program 121. FIG. 10 is a flowchart showing processing when system request implementation program 121 is executed at the control device 110. This processing is started as a result of the user designating execution start of system request implementation program 121 using the user interface 500.

First, in step S101, control device 110 displays the system request selection screen 501 at the user interface 500. When the system request selection screen 501 is displayed at user interface 500, in step S102, user input is awaited. At this time, the user makes various selections on the system request selection screen 501 using the user interface 500 and presses down the apply button 501A.

When the apply button 501A is pressed down, in step S103, the control device 110 receives information for filter conditions, application objects, simulation types and system requests selected by the user from the user interface 500. Continuing on, in step S104, the control device 110 determines whether or not a filter is set based on the received filter conditions. When it is determined that a filter is set (S104:

TRUE), in step S105, the control device 110 acquires objects matching with the filter conditions from the configuration definition management table 127.

When an object is acquired in this way (S105), or when it is determined that a filter is not set (S104: FALSE), in step S106, the control device 110 determines whether or not the simulation type is a simulation using an existing system configuration based on the received simulation type.

When the simulation is determined to be a simulation using an existing system configuration (S106: TRUE), in step S107, the control device 110 assigns "REAL" to the constant "simulation type" (SIMULATION_TYPE). On the other hand, when it is determined that the simulation is not a simulation using an existing system configuration, i.e. when it is determined that there is a simulation including a system reconfiguration (S106: FALSE), in step S108, the control device 110 assigns "VIRTUAL" to the simulation type.

When "REAL" or "VIRTUAL" is substituted in the simulation type, in step S109, the control device 110 executes configuration definition simulation processing. In step S110, the control device 110 executes results determination processing. The configuration definition simulation processing of step S109 and the results determination processing of step S110 is described in the following.

When the results determination processing of step S110 is complete, in step S111, the control device 110 displays simulation results screen 502 or 504 at the user interface 500.

Next, in step S112, the control device 110 determines whether the simulation type is "REAL" based on the value assigned to the simulation type. When it is determined that the simulation type is "REAL" (S112: TRUE), in step S113, the control device 110 awaits input from the user.

Next, in step S114, the control device 110 determines whether or not the execute button of the execute column 5023D has been pushed down. When it is determined that the execute button has been pushed down (S114: TRUE), in step S115, the control device 110 carries out processing to apply the configuration definition. The processing for applying this configuration definition is described in the following.

After the configuration definition application processing of step S115, or when it is determined that the execute button has not been pressed down (S114: FALSE), in step S116, the control device 110 determines whether or not the end button 502A or 504A has been pushed down. When it is determined that the end button 502A or 504A has not been pushed down (S116: FALSE), the control device 110 returns to processing of awaiting input from the user of step S113.

When it is determined that the end button 502A or 504A has been pressed down (S116: TRUE), or, in step S112, it is determined that the simulation type is not "REAL" (S112: FALSE), in step S117, the control device 110 displays the function setting changing results screen 506 or 507 at the user interface 500, and this processing is complete.

Figure 11:
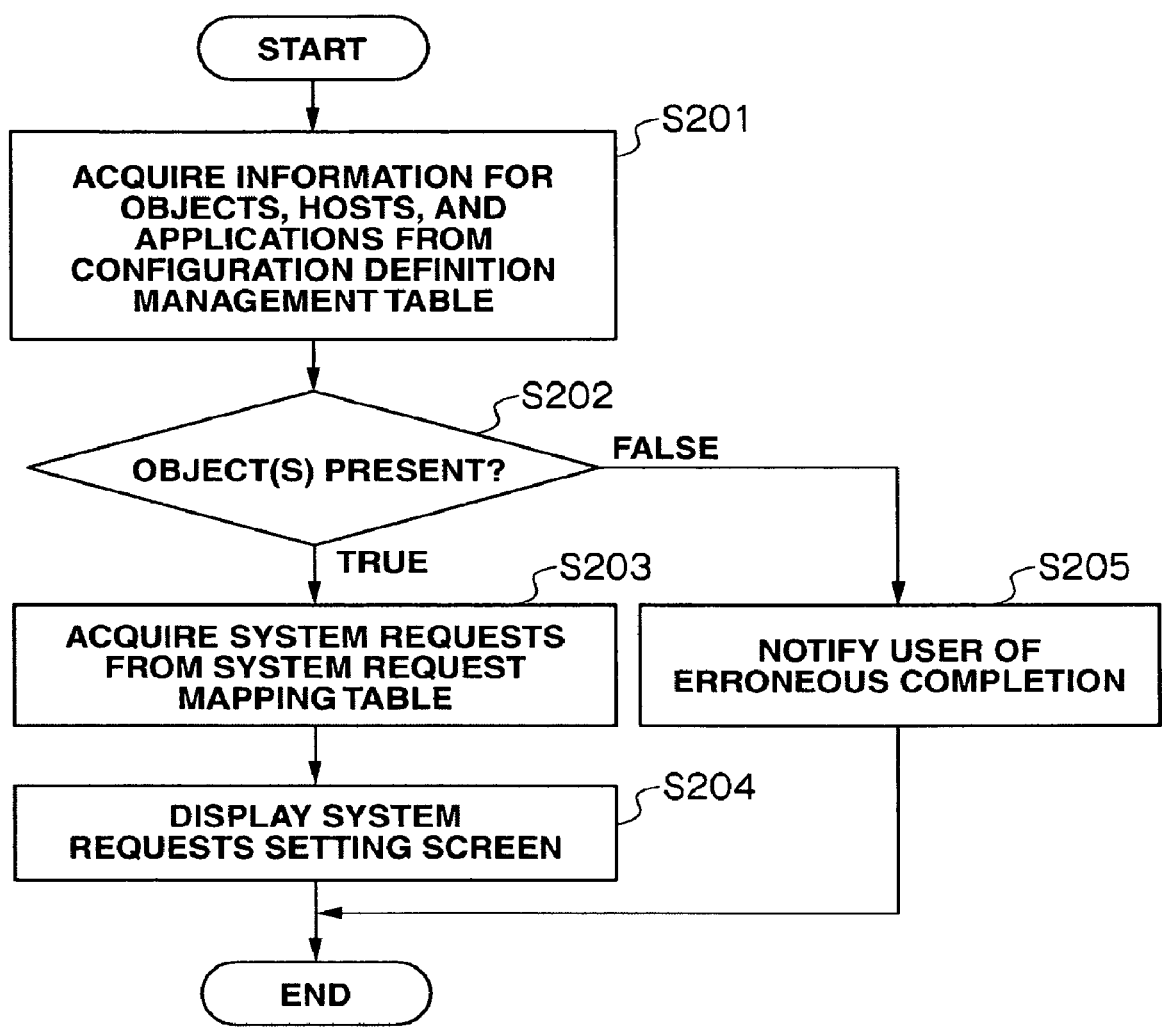
FIG. 11 is a flowchart showing display processing for the system request selection screen of the present invention.

Next, a description is given of display processing of the system request selection screen 501 of step S101. FIG. 11 is a flowchart showing display processing for the system request selection screen 501.

In step S201, the control device 110 acquires object, host and application information from the configuration definition management table 127. In step S202, the control device 110 determines whether or not an object is present based on information acquired in step S201.

When it is determined that an object is present (S202: TRUE), in step S203, the control device 110 acquires system requests from system request mapping table 123. In step S204, the control device 110 displays the system request selection screen 501 at the user interface 500 and this processing is complete.

On the other hand, when it is determined that an object is not present (S202: FALSE), in step S205, the control device 110 informs the user of erroneous completion. For example, the control device 110 displays a message indicating an erroneous completion at the user interface 500 and this processing is complete.

Figure 12:
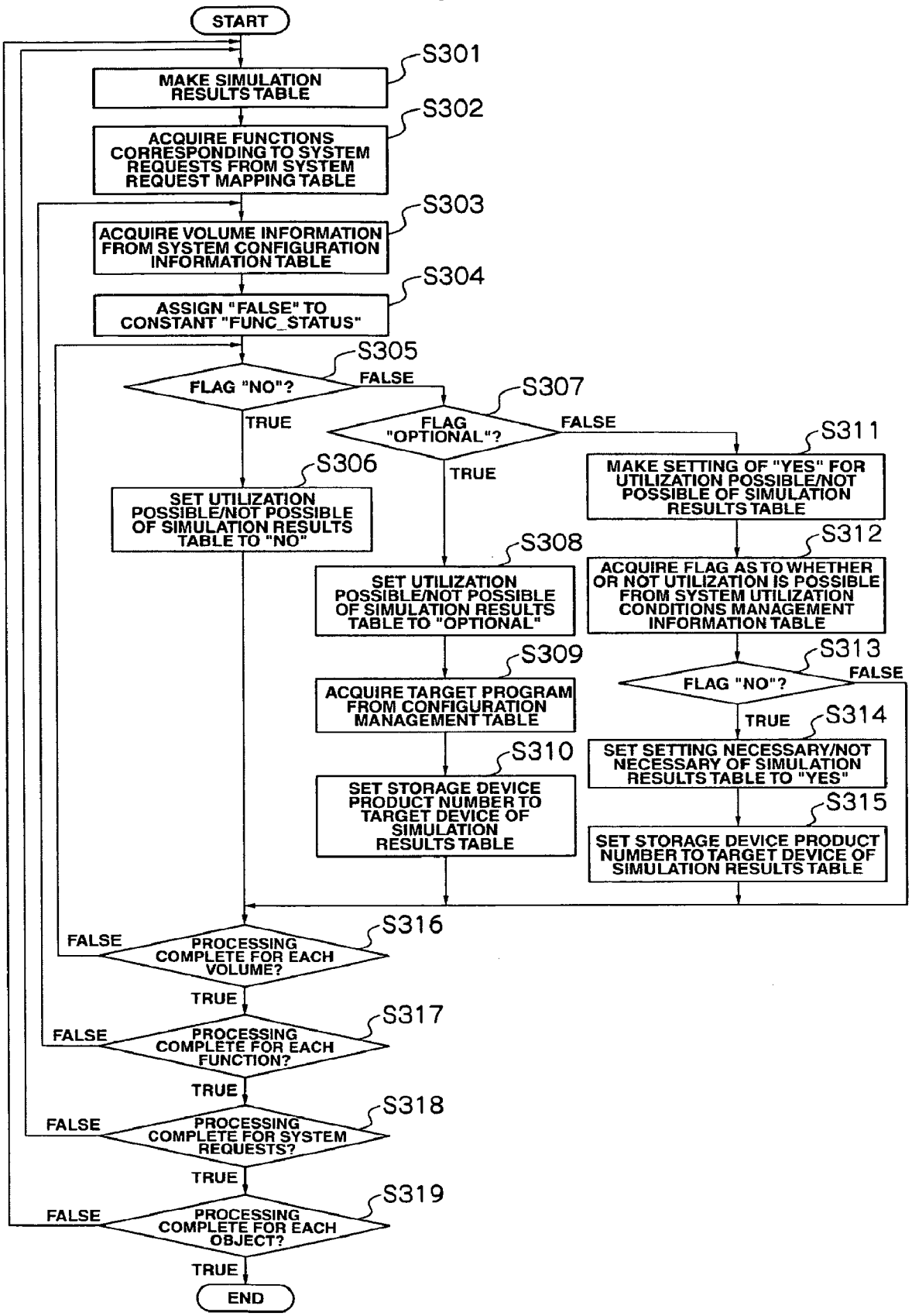
FIG. 12 is a flowchart showing configuration definition simulation processing of the present invention.

Next, a description is given of the configuration definition simulation processing of step S109. FIG. 12 is a flowchart showing configuration definition simulation processing.

In step S301, the control device 110 makes the simulation results table 129. In step S302, the control device 110 then acquires a function corresponding to the system requests from the system request mapping table 123. In step S303, the control device 110 acquires volume information from the system configuration information table 124. In step S304, the control device 110 assigns "FALSE" to the constant "function status" (FUNC_STATUS). The function state is used to hold a status as to whether or not this function can be used at this volume.

In step S305, the control device 110 determines for the function acquired in step S302 and for the volume acquired in step S303 whether or not the flag is "NO" based on the system configuration information table 124. When it is determined that the flag is "NO" (S305: TRUE), in step S306, the control device 110 sets utilization possible/not possible to "NO" for the function acquired in step S302 and the volume acquired in step S303 for the simulation results table 129.

On the other hand, when it is determined that the flag is not "NO", in step S307, the control device 110 determines whether or not the flag is "OPTIONAL". When it is determined that the flag is "OPTIONAL" (S307: TRUE), in step S308, the control device 110 sets utilization possible/not possible for simulation results table 129 to "OPTIONAL" for the function acquired in step S302 and the volume acquired in step S303. Next, in step S309, the control device 110 acquires a target program from the configuration management table 126. In step S310, the control device 110 sets the product number of the storage device at the target device of the simulation results table 129.

Further, when it is determined that the flag is not "OPTIONAL" (S307: FALSE), in step S311, the control device 110 sets the utilization possible/not possible setting for the simulation results table 129 to "YES" for the function acquired in step S302 and the volume acquired in step S303. In step S312, the control device 110 acquires a flag as to whether or not utilization is taking place for the function acquired in step S302 and the volume acquired in step S303 from the system utilization conditions management table 125. In step S313, the control device 110 determines whether or not the acquired flag is "NO". When it is determined that the flag is "NO" (S313: TRUE), in step S314, the control device 110 sets setting necessary/not necessary for simulation results table 129 to "YES" for the function acquired in step S302 and the volume acquired in step S303. In step S315, the control device 110 sets the product number of the storage device at the target device of the simulation results table 129.

When utilization possible/not possible of simulation results table 129 is set to "NO" in step S306, when the product number of the storage device is set to the target device of the simulation results table 129 in step S310, when the product number of the storage device is set to the target device of the simulation results table 129 in step S315, or when it is determined in step S313 that the flag is not "NO" (S313: FALSE), in step S316, the control device 110 determines whether or not processing is complete for each of the volumes.

When it is determined that processing is not complete for each volume (S316: FALSE), the control device 110 returns to the processing of step S305. When it is determined that processing is complete for each volume (S316: TRUE), in step S317, the control device 110 determines whether or not processing is complete for each function.

When it is determined that processing is not complete for each function (S317: FALSE), the control device 110 returns to the processing of step S303. When it is determined that processing is complete for each function (S317: TRUE), in step S318, the control device 110 determines whether or not processing is complete for each system request.

When it is determined that processing is not complete for each system request (S318: FALSE), the control device 110 returns to the processing of step S301. When it is determined that processing is complete for each system request (S318: TRUE), in step S319, it is determined whether or not processing is complete for each object.

When it is determined that processing is not complete for each object (S319: FALSE), the control device 110 returns to the processing of step S301. When it is determined that processing is complete for each object (S319: TRUE), the control device 110 completes this processing.

Figure 13:
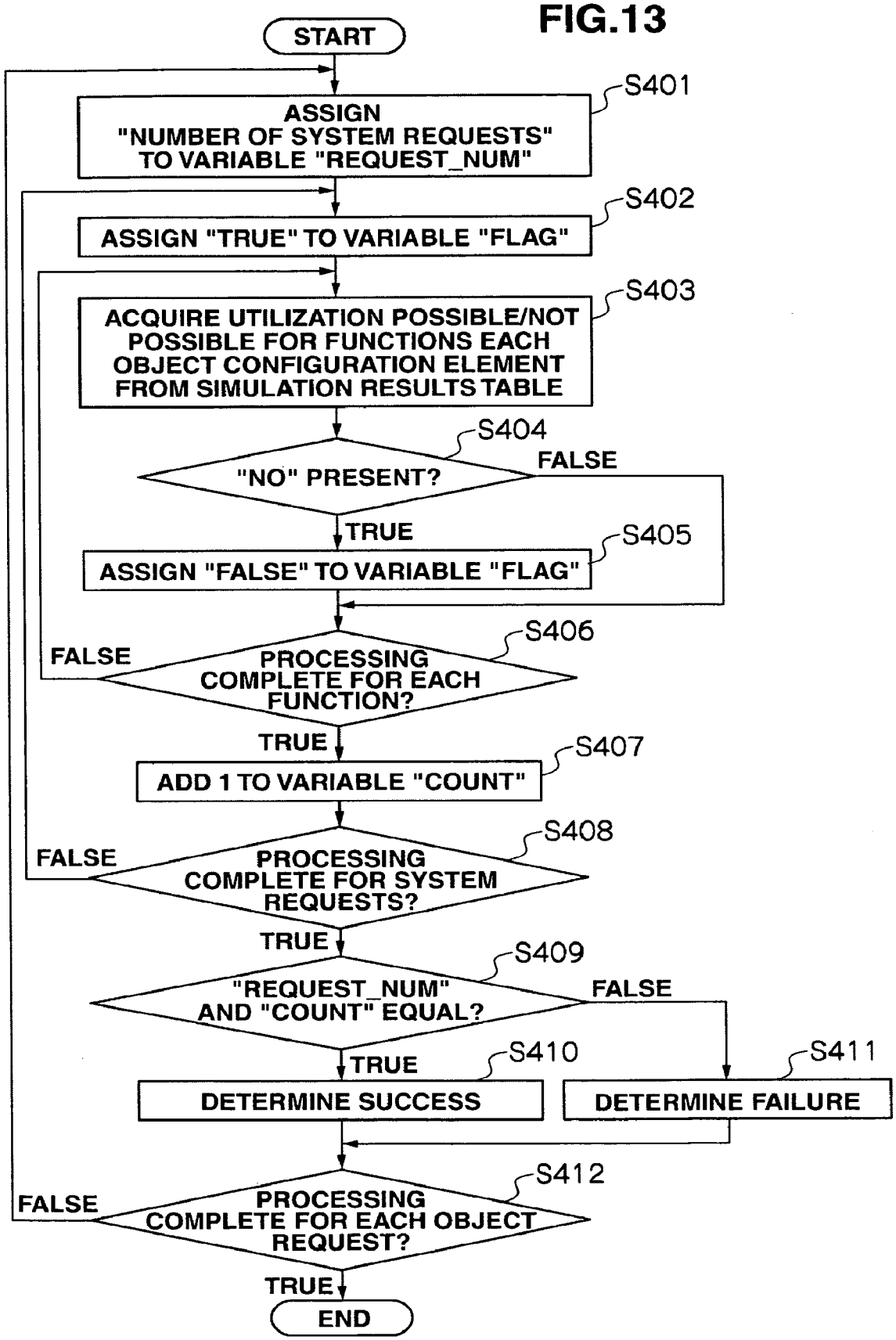
FIG. 13 is a flowchart showing results determination processing of the present invention.

Next, a description is given of results determination processing of step S110. FIG. 13 is a flowchart showing results determination processing.

In step S401, the control device 110 assigns the number of system requests to the variable "request number" (REQUEST_NUM). In step S402, the control device 110 assigns "TRUE" to the variable flag (FLAG). In step S403, the control device 110 acquires function utilization possible/not possible every configuration element of an object from the simulation results table 129.

In step S404, the control device 110 determines whether or not "NO" is present for the acquired utilization possible/not possible. When "NO" is determined to be present (S404: TRUE), in step S405, the control device 110 assigns "FALSE" to the variable "flag".

When "FALSE" is assigned to the variable "flag" (S405), or when "NO" is not present (S404: FALSE), in step S406, the control device 110 determines whether or not processing is complete for each function.

When it is determined that processing is not complete for each function (S406: FALSE), the control device 110 returns to the processing of step S403. Further, when it is determined that processing is complete for each function (S406: TRUE), in step S407, the control device 110 adds 1 to the variable "count" (COUNT).

When 1 is added to the variable "count" (S407), in step S408, the control device 110 determines whether or not processing is complete for each of the system requests. When it is determined that processing is not complete for each system request (S408: FALSE), the control device 110 executes the processing of step S402.

When it is determined that processing for each system request is complete (S408: TRUE), in step S409, the control device 110 determines whether or not the number of the variable "request number" and the count number of the variable "count" are equal. When it is determined that the number and the count number are the same (S409: TRUE), in step S410, the control device 110 determines success. Further, when it is determined that the number and the count number are not equal (S409: FALSE), in step S411, the control device 110 determines failure.

When success is determined (S410), or when failure is determined (S411), in step S412, the control device 110 determines whether or not processing is complete for each object. When it is determined that processing is not complete for each object (S412: FALSE), the control device 110 returns to the processing of step S401. When it is determined that processing is complete for each object (S412: TRUE), the control device 110 completes this processing.

Figure 14:
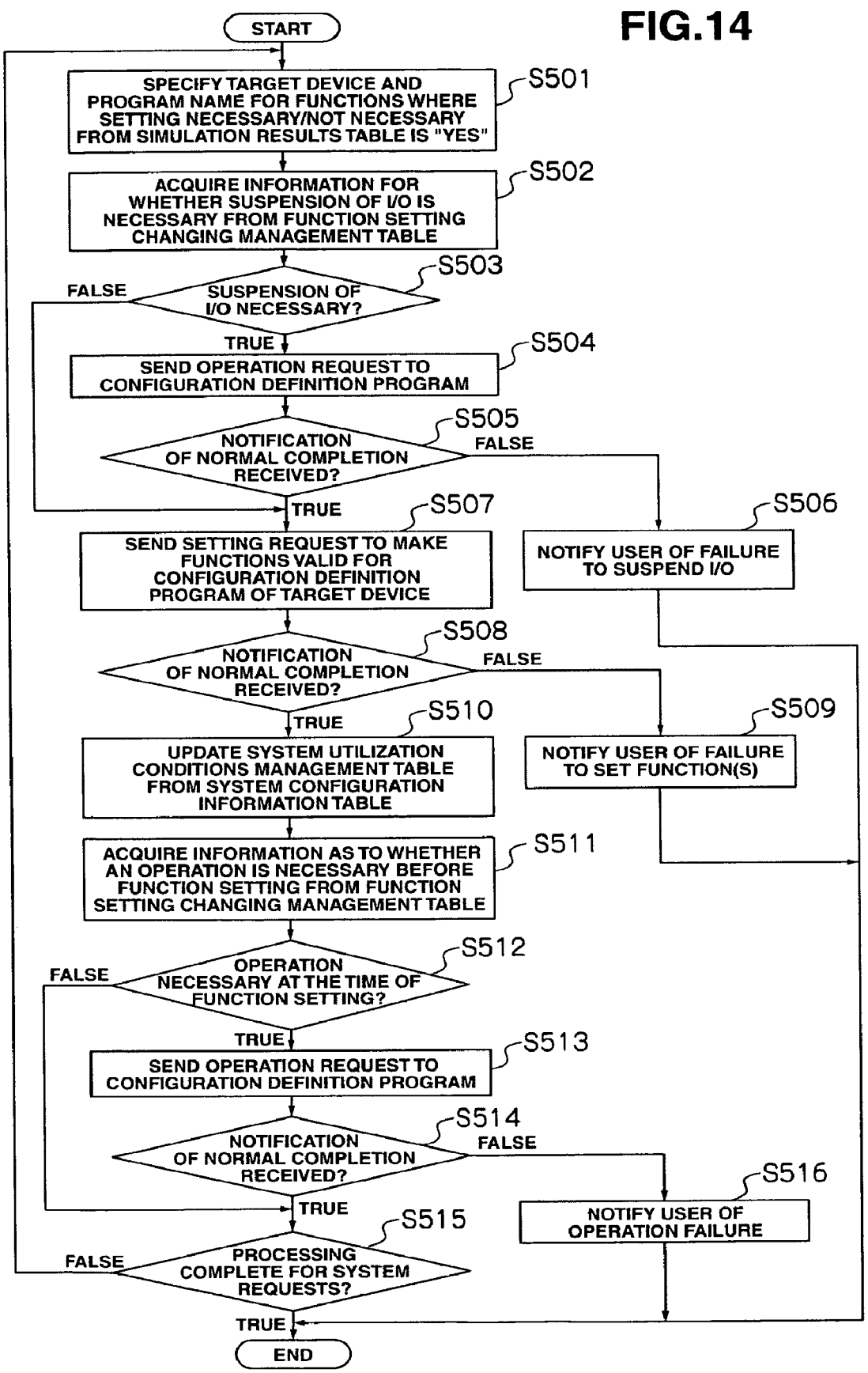
FIG. 14 is a flowchart showing configuration definition application processing of the present invention.

Next, a description is given of the configuration definition application processing of step S115. FIG. 14 is a flowchart showing configuration definition application processing.

In step S501, the control device 110 specifies target device and program names for functions where setting necessary/not necessary from the simulation results table 129 is "YES". In step S502, the control device 110 acquires information as to whether or not suspension of I/O is necessary from the function setting changing management table 128. The control device 110 then determines whether or not it is necessary to interrupt I/O in step S503 based on this acquired information.

When it is determined that interruption of I/O is necessary (S503: TRUE), in step S504, the control device 110 transmits an operation request to the configuration definition program (for example, configuration definition program 321 of the storage device 300). In step S505, the control device 110 determines whether or not notification of normal completion is received from the configuration definition program. When it is determined that notification of normal completion is not received (S505: FALSE), in step S506, the control device 110 notifies the user that I/O suspension has failed. For example, the control device 110 displays a message indicating that suspension of I/O has failed at the user interface 500.

When it is determined that suspension of I/O is not necessary (S503: FALSE), or when it is determined that notification of normal completion has been received (S505: TRUE), in step S507, the control device 110 sends a setting request to make a function valid to the configuration definition program of the target device. When it is determined in step S508 that notification of normal completion has not been received by the configuration definition program (S508), the control device 110 notifies the user of failure to set the function in step S509. For example, the control device 110 displays a message indicating failure to set the function at the user interface 500.

When it is determined that normal completion notification is received (S508: TRUE), in step S510, the control device 110 updates the system utilization conditions management table 125 from the system configuration information table 124. In step S511, the control device 110 acquires information as to whether or not any necessary functions exist prior to setting a function from the function setting changing management table 128. In step S512, the control device 110 determines whether or not there is an essential operation at the time of setting a function based on information acquired in step S511.

When it is determined that there is an essential operation at the time of function setting (S512: TRUE), in step S513, the control device 110 sends an operation request to the configuration definition programs 221, 321 and 421. In step S514, the control device 110 determines whether or not notification of normal completion is received. When it is determined that notification of normal completion is not received (S514: FALSE), in step S516, the user is notified of failure of the operation. For example, the control device 110 displays a message indicating failure of the operation at the user interface 500.

When it is determined that notification of normal completion is received (S514: TRUE), or when it is determined that there are no essential operations at the time of function setting (S512: FALSE), in step S515, the control device 110 determines whether or not processing is complete for each system request. When it is determined that processing is not complete for each system request (S515: FALSE), the control device 110 returns to the processing of step S501.

When it is determined that processing is complete for each system request (S515: TRUE), and when the processing of step S506, S509 and S516 is carried out, the control device 110 completes this processing.

Figure 15:
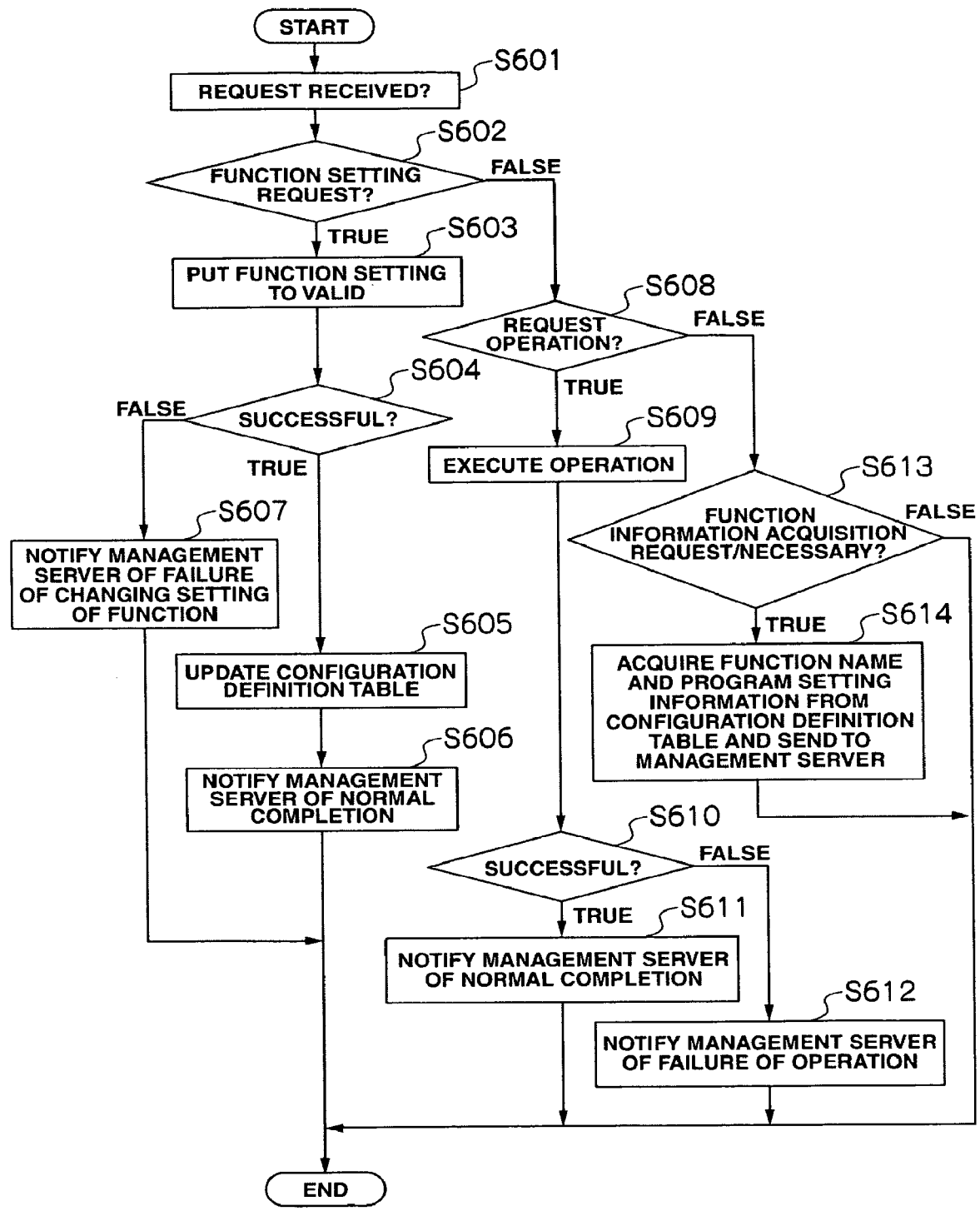
FIG. 15 is a flowchart showing processing for the time of executing a configuration definition program at a control device of a storage device.

Next, a description is given of processing at the time of executing the configuration definition program 321 at the control device 310 of the storage device 300. FIG. 15 is a flowchart showing this process. Processing when the configuration definition program 221 is executed at the control device 210 of the operation host 200 and processing when the configuration definition program 421 is executed at the control device 410 of the storage device 400 is the same as processing when the configuration definition program 321 is executed by the control device 310 and is therefore not described.

In step S601, the control device 310 receives a request from the management server 100. When this request is received, in step S602, the control device 310 determines whether or not this request is a function setting request. When this request is determined to be a function setting request (S602: TRUE), in step S603, the control device 310 makes this function setting valid.

In step S604, the control device 310 determines whether or not making the function setting valid has been successful. When success is determined (S604: TRUE), in step S605, the control device 310 updates the configuration definition table 322. In step S606, the control device 310 notifies the management server 100 of normal completion. On the other hand, when failure is determined (S604: FALSE), in step S607, the control device 310 notifies the management server 100 that changing of the function setting has failed.

When it is determined that the request received from the management server 100 is not a function setting request (S602: FALSE), in step S608, the control device 310 determines whether or not this request is an operation request. When this is determined to be an operation request (S608: TRUE), in step S609, the control device 310 executes an operation based on the operation request.

In step S610, the control device 310 determines whether or not this operation is successful. When success is determined (S610: TRUE), in step S611, the control device 310 notifies the management server 100 of normal completion. Further, when failure is determined (S610: YES), in step S612, the control device 310 notifies the management server 100 that the operation has failed.

On the other hand, when it is determined that the request received from the management server 100 is not an operation request (S608: FALSE), in step S613, the control device 310 determines whether or not this request is a function information acquisition request. When this request is determined to be a function information acquisition request (S613: TRUE), in step S614, the control device 310 acquires the function name and program setting information from the configuration definition table 322 for transmission to the management server 100.

When it is determined in step S606, step S607, step S611, step S612 and step S614 that the request acquired from the management server 100 is not a function information acquisition request (S613: FALSE), the control device 310 completes this processing.

Figure 16:
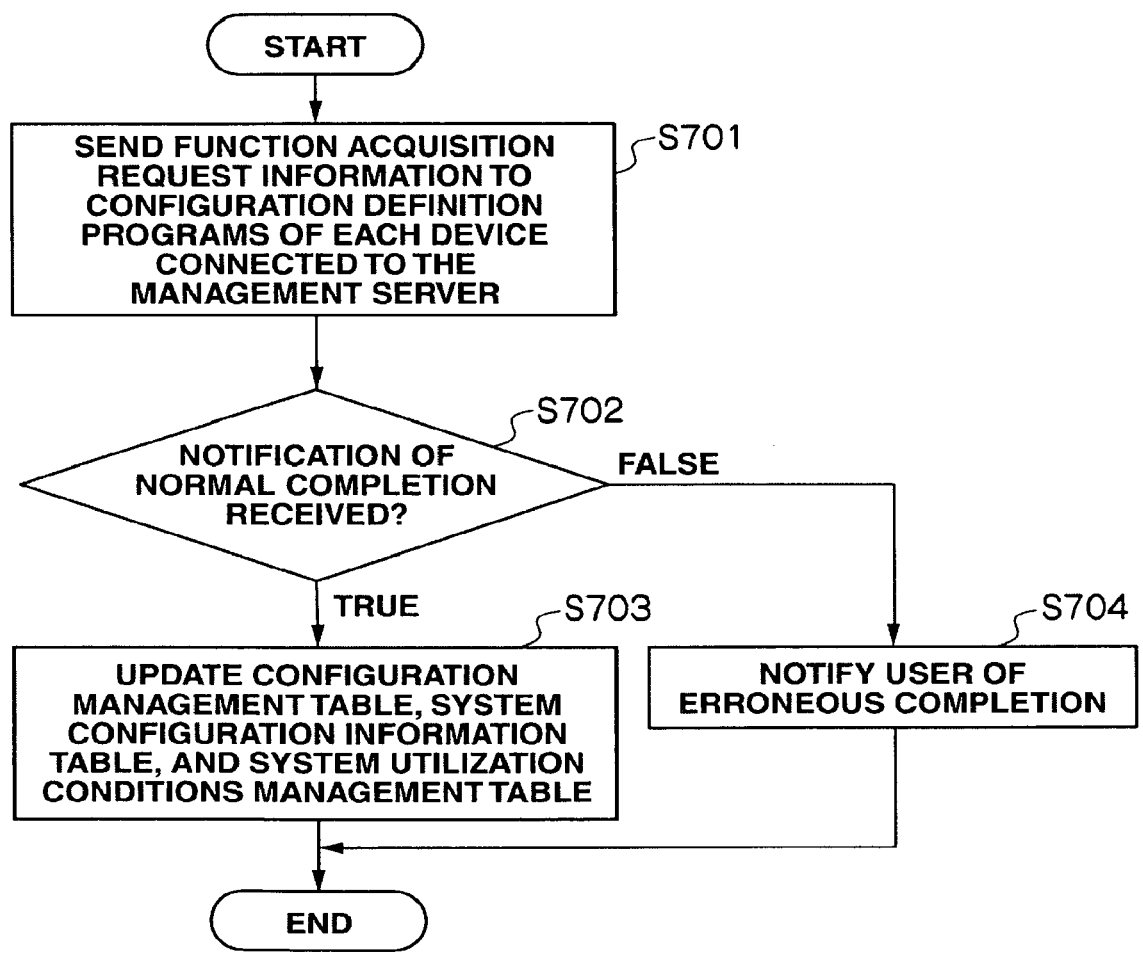
FIG. 16 is a flowchart showing processing for the time of executing a configuration information updating program at a control device of a management server.

Next, a description is given of the configuration information updating program 122. FIG. 16 is a flowchart showing processing when the configuration information updating program 122 is executed at the control device 110. This processing is started by, for example, a user giving instructions via the user interface 500.

In step S701, the control device 110 sends function acquisition request information to the configuration definition programs for each device connected to the management server 100. Namely, function acquisition request information from the management server 100 is sent to the configuration definition program 221 of the operation host 200, the configuration definition program 321 of the storage device 300 and the configuration definition program 421 of the storage device 400.

In step S702, the control device 110 determines whether or not notification of normal completion is received. When it is determined that normal completion notification is received (S702: TRUE), in step S703, the control device 110 updates the configuration management table 126, the system configuration information table 124 and the system utilization conditions management table 125. As a result, the management server 100 is capable of acquiring the newest configuration information for the operation host 200, storage device 300 and storage device 400.

On the other hand, when it is determined that notification of normal completion is not received (S702: FALSE), in step S704, the control device 110 notifies the user of erroneous completion. For example, the control device 110 displays a message indicating an erroneous completion at the user interface 500.

When updating of the configuration management table 126, the system configuration information table 124 and the system utilization conditions management table 125 of step S704 and the notification of erroneous completion to the user of step S705 is carried out, the control device 110 completes this processing.

The control device 110 is capable of acquiring the newest configuration information for the operation host 200, storage device 300, and storage device 400 managed by the management server 100 by executing this configuration information updating program 122. By then instructing execution of the configuration information updating program 122 prior to the user instructing execution of the system request implementation program 121 to the management server 100 from the user interface 500, it is possible to execute the system request implementation program 121 based on the newest configuration information for the operation host 200, storage device 300 and storage device 400. A configuration is also possible where the configuration information updating program 122 is automatically executed before executing the system request implementation program 121 when start up of the system request implementation program 121 is instructed by the user on the user interface 500. In the operation described in the following, a description is given of the case of automatic execution of the configuration information updating program 122 when the system request implementation program 121 is started up.

Next, a description is given of user reconfiguration of a system for the case of carrying out simulation using an existing system and the case of carrying out simulation including reconfiguration of a system, respectively, for the operation occurring at the storage system 10 configured in the manner described above. In the case of carrying out either simulation, when activation of the system request implementation program 121 is designated by the user, the configuration information updating program 122 is executed before execution of the system request implementation program 121. As a result, the management server 100 of the storage system 10 is capable of obtaining the newest configuration information from the operation host 200 and storage device 300 and 400. When simulation is carried out for the reconfiguration of the system, the user is capable of carrying out simulation based on the newest configuration information.

First, a description is given of the case of carrying out simulation using an existing system. First, the user operates the user interface 500, and the system request selection screen 501 is displayed at the user interface 500. The user then selects the system request application objects, simulation type and system requests using the system request selection screen 501. One or more of the system requests the user wishes to implement is then selected from the system requests. The user then selects "simulation using existing system configuration" as the simulation type, "copy pair 1" and "copy pair 2" as the system request application objects, and "It is wished to transfer encrypted data between copy pairs" as the system requests. When selection of these items is complete, the user presses down the apply button 501A. As a result, information selected by the user from the user interface 500 is sent to the management server 100.

The management server 100 then searches for functions necessary in order to satisfy the system requests selected by the user using the information transmitted from the user interface 500 and the system request mapping table 123. When this searching is complete, it is checked as to whether or not objects selected as system request application objects are capable of implementing the functions using the system configuration information table 124. If all of the functions are utilizable, it is determined that implementation of the system requests is possible. The management server 100 executes this process every system request. Namely, whether or not copy pair 1 and copy pair 2 are capable of implementing the transfer of encrypted data using the existing system configuration is simulated.

After this process is executed, the management server 100 displays the simulation results screen 502 at the user interface 500 as simulation results. Whether or not it is possible to execute transfer of encrypted data using the existing system configuration for copy pair 1 and copy pair 2 respectively is displayed at simulation results screen 502 as the simulation results. If it is possible for the copy pair 1 to implement the functions, "OK" is displayed at system request column 5023B, and if it is possible for copy pair 2 to implement the function, "NG" is displayed at system request column 5023B. Further, when it is possible to transfer encrypted data, an execute button is displayed at execute column 5023D corresponding to the objects for copy pair 1 and copy pair 2.

In the event that it is possible for copy pair 1 to implement transfer of encrypted data using a system configuration for an existing system, when transfer of encrypted data using copy pair 1 is set, the user inputs at the execute button of execute column 5023D corresponding to copy pair 1 displayed at the simulation results screen 502.

When the execute button is inputted in this way, an instruction to make the function designated by input of the execute button valid is sent to the device having an object that is the target of the system requests from the management server 100. Namely, an instruction to make a function for carrying out transfer of encrypted data using the copy pair 1 valid is sent to the storage device 300 and the storage device 400 constituting the copy pair 1.

A configuration definition program is stored at each device to which instructions are sent. When an instruction to make a function valid is sent from the management server 100, this function is set to valid based on this instruction. For example, the control device 310 of the storage device 300 receiving the instruction executes the configuration definition program 321 stored in the main memory 320, and a function for transferring encrypted data is set to valid for the volumes constituting copy pair 1. Further, the control device 410 of the storage device 400 receiving the instruction executes the configuration definition program 422 stored in the main memory 420, and a function for transferring encrypted data is set to valid for the volumes constituting copy pair 1. As a result, the encrypted data transfer function is made valid for copy pair 1.

Next, a description is given of the case of carrying out simulation including system reconfiguration. First, the user operates the user interface 500, and the system request selection screen 501 is displayed at the user interface 500. The user then selects the system request application objects, simulation type and system requests using the system request selection screen 501. One or more of the system requests the user wishes to implement is then selected from the system requests. The user then selects "simulation including system reconfiguration" as the simulation type, "copy pair 1" and "copy pair 2" as the system request application objects, and "It is wished to transfer encrypted data between copy pairs" as the system requests. When selection of these items is complete, the user presses down the apply button 501A. As a result, information selected by the user from the user interface 500 is sent to the management server 100.

The management server 100 then searches for functions necessary in order to satisfy the system requests selected by the user using the information transmitted from the user interface 500 and the system request mapping table 123. When this searching is complete, it is checked as to whether or not objects selected as system request application objects are capable of implementing the functions using the system configuration information table 124, and as to whether or not implementation is possible as a result of system reconfiguration. If all of the functions are utilizable, it is determined that implementation of the system requests is possible. The management server 100 executes this process every system request. Namely, it is simulated as to whether or not copy pair 1 and copy pair 2 are capable of implementing the transfer of encrypted data using the existing system configuration, and whether or not implementation is possible if reconfiguration takes place.

After this process is executed, the management server 100 displays the simulation results screen 504 at the user interface 500 as simulation results. Whether or not it is possible to execute transfer of encrypted data using the existing system configuration for copy pair 1 and copy pair 2 respectively, and whether implementation is possible if the system is reconfigured, are displayed at simulation results screen 504 as the simulation results. If it is possible for the copy pair 1 to implement the functions, "OK" is displayed at system request column 5023B, and if it is possible for copy pair 2 to implement the functions if the system is reconfigured, "OPTIONAL" is displayed at system request column 5023B.

Further, in the event that copy pair 2 is capable of transfer of the encrypted data if the system is reconfigured, when it is wished to know what operation is to be performed at copy pair 2 so that implementation can be achieved, the user presses the detail button displayed at detail column 5043C.

In doing so, the simulation results detail screen 505 is displayed at the user interface 500. It is therefore possible for the user to visually confirm what kind of operation needs to take place in order to implement the functions using the display of the necessary operations for implementation column 5054.

Therefore, according to the storage system 10, if the system requests desired by the user within the storage system 10 are possible as a result of carrying out a simulation for the system requests desired by the user using a simulation using the existing system configuration for the operation host 200, storage device 300 and storage device 400 managed by the management server 100, "OK" is displayed at the system request column 5023B of the simulation results screen 502, and an execute button is displayed at the execute column 5023D of the simulation results screen 502. It is then possible to implement the system requests desired by the user within the storage system 10 by the user performing an input at the execute button displayed at the execute column 5023D. Namely, at the storage system 10, it is possible to carry out operations appropriate for the system requests desired by the user and it is possible to provide support for the system reconfiguration occurring at the storage system 10.

Further, there may be system requests amongst the system requests that cannot be implemented using the current system configuration but that can be implemented by reconfiguring the system for the devices managed by the management server 100 such as upgrading program versions etc. If this system reconfiguration takes place, it is possible to instruct the user of the functions that may become implementable by performing simulation including system reconfiguration. Specifically, "OPTIONAL" is displayed in system request column 5043B of the simulation results screen 504. Further, the system requests desired by the user can be implemented by the user performing an input at the detail button displayed at the detail column 5043C corresponding to the object "OPTIONAL" is displayed for and it can therefore be visually confirmed as to what kind of operation needs to be performed.

In the above embodiment, a description is given of the case where, in a storage system 10 having the operation host 200, the storage device 300 the storage device 400, and the management server 100 for managing the operation host 200, storage device 300 and storage device 400, the operation host 200, storage device 300 and storage device 400 are provided with configuration definition tables 222, 322, and 422 providing the respective functions and storing setting conditions for the functions. The management server 100 is comprised of the system request mapping table 123 for storing a correspondence relationship of functions supplied by the operation host 200, storage device 300 and storage device 400 and the system requests for the storage system 10, the configuration management table 126 for storing information for functions supplied by the operation host 200, storage device 300 and storage device 400 and the user interface 500 for receiving input such as system requests such as "it is wished to transfer encrypted data between copy pairs". Functions corresponding to system requests acquired by the user interface 500 are then acquired using the system request mapping table 123. A simulation then takes place as to whether or not it is possible to implement the system requests from the acquired functions and functions corresponding to system requests acquired from the user interface 500 at the current storage system 10 acquired using the system request mapping table 123. The operation host 200, storage device 300, and storage device 400 are then notified of an instruction setting functions occurring at the configuration definition table corresponding to the system requests to valid based on the simulation results. However, the present invention is by no means limited in this respect.

Further, a description is given of the case where the management server 100 displays an execute button for execution at execute column 5023D of the simulation results screen 502 displayed at the user interface 500 together with the simulation results when the system requests can be implemented. A notification to put functions for implementing system requests is then carried out for the storage device 300 and the storage device 400 as a result of an input at this execute button. However, the present invention is by no means limited in this respect.

Further, a description is given of the case where the management server 100 collects the supplied functions stored in the configuration definition tables 222, 322 and 422 and the setting conditions for these functions, and updates the information stored in the configuration management table 126, system configuration information table 124 and system utilization conditions management table 125, but the present invention is by no means limited in this respect.

Further, a description is given of the case where the management server 100 receives an input for a simulation type for whether simulation is executed using a current system configuration together with the system requests or whether simulation including reconfiguration of the storage system is executed from the system request selection screen 501 of the user interface 500, with simulation then being executed based on the simulation type received from this input, but the present invention is by no means limited in this respect.

Further, a description is also given of the case where the management server 100 executes a simulation including reconfiguration of the storage system 10, and when simulation results are obtained that it is possible to implement functions corresponding to the system requests if reconfiguration is carried out, information for reconfiguring the storage system is displayed as a message "please install program 1 on storage 2" in the necessary operations for implementation column 5054 of the simulation results detail screen 505 at the user interface 500 but the present invention is by no means limited in this respect.

In the embodiment described above, a configuration is described where the user interface 500 is connected via the management server 100 and the network but a configuration where the user interface 500 is included in the management server 100 is also possible.

The present invention may be broadly applied to various storage systems, management servers, storage system reconfiguration support methods and management server system reconfiguration support methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
    a host computer;
    at least one storage device including disk units and a controller, which provides a logical volume to the host computer based on the disk units and a plurality of storage functions;
    a management server storing storage function management information indicating that the at least one storage device provides the plurality of storage functions, and storing correspondence information indicating correspondence relationships between the plurality of storage functions and a plurality of system requests,
    wherein the management server:
    (A) receives a system request input which indicating one of the plurality of system requests;
    (B) decides that the system request input is satisfied by the provided storage function, based on the storage function management information and the correspondence information;

(C) if the system request input is not satisfied, selects an validate candidate storage function and a validate candidate storage device which is one of the at least one storage device, for satisfying the system request input by validating the validate candidate storage function to the validate candidate storage device; and (D) in response to the system request input, displays an identifier of the validate candidate storage function and an identifier of the validate candidate storage device as a required function for satisfying the system request input, wherein if the system request input is satisfied by the provided storage function, the management server displays an identifier of the provided storage function as a required function for satisfying the system request input, and wherein if the validate candidate storage function is not selected in the (C), the management server displays that the system request input is not satisfied by the at least one storage device.

2. The storage system according to claim 1,
wherein the management server sends a notification to the validate candidate storage device for providing the validate candidate storage function by the validate candidate storage device.

3. The storage system according to claim 1,
wherein the management server receives input for avoiding to display the (D).

4. A management computer coupled at least one storage device including disk units and a controller, which provides a logical volume to a host computer based on the disk units and a plurality of storage functions, the management computer comprising:

a memory storing storage function management information indicating that the at least one storage device provides the plurality of storage functions, and correspondence information indicating correspondence relationships between the plurality of storage functions and a plurality of system requests; and a CPU to be configured to:

(A) receive a system request input which indicating one of the plurality of system requests;

(B) decide that the system request input is satisfied by the provided storage function, based on the storage function management information and the correspondence information;

(C) if the system request input is not satisfied, select an validate candidate storage function and a validate candidate storage device which is one of the at least one storage device, for satisfying the system request input by validating the validate candidate storage function to the validate candidate storage device; and (D) in response to the system request input, displays an identifier of the validate candidate storage function and an identifier of the validate candidate storage device as a required function for satisfying the system request input, wherein if the system request input is satisfied by the provided storage function, the CPU displays an identifier of the provided storage function as a required function for satisfying the system request input, and wherein if the validate candidate storage function is not selected in the (C), the CPU displays that the system request input is not satisfied by the at least one storage device.

5. The management computer according to claim 4,
wherein the CPU sends a notification to the validate candidate storage device for providing the validate candidate storage function by the validate candidate storage device.

6. The management computer according to claim 4,
wherein the CPU receives input for avoiding to display the (D).

7. A computer readable media storing a computer program for a management computer coupled at least one storage device including disk units and a controller, which provides a logical volume to a host computer based on the disk units and a plurality of storage functions, the computer program comprising a step of:

(a) storing storage function management information indicating that the at least one storage device provides the plurality of storage functions, and a correspondence information indicating correspondence relationships between the plurality of storage functions and a plurality of system requests;

(A) receiving a system request input which indicating one of the plurality of system requests;

(B) deciding that the system request input is satisfied by the provided storage function, based on the storage function management information;

(C) if the system request input is not satisfied, selecting an validate candidate storage function and a validate candidate storage device which is one of the at least one storage device, for satisfying the system request input by validating the validate candidate storage function to the validate candidate storage device; and (D) in response to the system request input, displaying an identifier of the validate candidate storage function and an identifier of the validate candidate storage device as a required function for satisfying the system request input, wherein if the system request input is satisfied by the provided storage function, the computer program causes the management computer to display an identifier of the provided storage function as a required function for satisfying the system request input, and wherein if the validate candidate storage function is not selected in the (C), the computer program causes to the management computer to display that the system request input is not satisfied by the at least one storage device.

8. The computer readable media according to claim 7,
wherein the computer program causes the management computer to send a notification to the validate candidate storage device for providing the validate candidate storage function by the validate candidate storage device.

9. The computer readable media according to claim 7,
wherein the computer program causes the management computer to receive input for avoiding to display the (D).

10. The storage system according to claim 1,
wherein the plurality of storage functions include:
encryption of stored data in the logical volume;
write-inhibiting of stored data in the logical volume; and
data transfer encryption from the at least one storage device.

11. The management computer according to claim 4,
wherein the plurality of storage functions are security functions regarding data of the logical volume, and the validate candidate storage device requires a newer storage program than currently using storage program in the at least one storage device.

12. The management computer according to claim 4, wherein the management computer does not allow to use the newest version of the storage program including the validate candidate storage function before displaying of the identifier of the validate candidate storage function, and wherein, when displaying of the identifier of the validate candidate storage function, the management computer displays the usability of the validate candidate storage function.

* * * * *